(12) United States Patent
Dahan et al.

(10) Patent No.: US 12,694,317 B2
(45) Date of Patent: Jul. 28, 2026

(54) GENERATION OF QUANTUM LIGHT STATES

(71) Applicant: Technion Research & Development Foundation Limited, Haifa (IL)

(72) Inventors: Raphael Dahan, Haifa (IL); Alexey Gorlach, Haifa (IL); Gefen Baranes, Haifa (IL); Ron Ruimy, Haifa (IL); Ido Kaminer, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 814 days.

(21) Appl. No.: 18/147,366

(22) Filed: Dec. 28, 2022

(65) Prior Publication Data

US 2023/0214702 A1 Jul. 6, 2023

Related U.S. Application Data

(60) Provisional application No. 63/294,585, filed on Dec. 29, 2021.

(51) Int. Cl.
*G06N 10/20* (2022.01)
*G06N 10/40* (2022.01)
*G06N 10/70* (2022.01)

(52) U.S. Cl.
CPC .................................. *G06N 10/40* (2022.01)

(58) Field of Classification Search
CPC ......... G06N 10/40; G06N 10/20; G06N 10/70
See application file for complete search history.

(56) References Cited

U.S. PATENT DOCUMENTS

| | | | | |
|---|---|---|---|---|
| 7,449,672 B2 * | 11/2008 | Beausoleil, Jr. | ....... | B82Y 10/00 |
| | | | | 250/214 R |
| 11,558,069 B1 * | 1/2023 | Sparrow | ................ | G06N 10/40 |
| 2022/0101168 A1 * | 3/2022 | Bourassa | ............... | G06N 10/20 |

OTHER PUBLICATIONS

Hayun et al., Shaping quantum photonic states using free electrons, Science Advances, Mar. 10, 2021, pp. 1-11. (Year: 2021).*

(Continued)

*Primary Examiner* — Nghia M Doan
(74) *Attorney, Agent, or Firm* — FisherBroyles, LLP; Roger L. Browdy; James E. Mrose

(57) ABSTRACT

A photonic quantum state generator is presented for generation of one or more predetermined photonic quantum states in a range from radiofrequency to X-ray. The generator comprises: a free particles source controllably operable to provide a flow of said free particles with predetermined one or more flow parameters; a shaping unit located in a vicinity of a flow of the free particles and adapted to apply wavefunction shaping to provide coherently shaped free particles in either one of time-energy domain or space-momentum domain; and an interaction unit comprising a photonic structure and defining an interaction region enabling m interactions ($m \geq 1$) between a photonic mode within said interaction region and the flow of the coherently shaped free particles having said one or more flow parameters satisfying a phase-matching condition with respect to the photonic mode, thereby generating said one or more predetermined photonic quantum states by a conditional displacement mechanism.

37 Claims, 16 Drawing Sheets
(12 of 16 Drawing Sheet(s) Filed in Color)

(56)     References Cited

OTHER PUBLICATIONS

Dahan et al., Resonant phase-matching between a light wave and a free-electron wavefunction, Nat. Phys., 2020, pp. 1-11 (Year: 2020).*

Su et al., Conversion of Gaussian states to non-Gaussian states using photo No. resolving detectors, Physic Rev A (Coll Park) 100, Apr. 19, 2019, pp. 1-37 (Year: 2019).*

D. Gottesman, A. Kitaev, and J. Preskill, Encoding a Qubit in an Oscillator, Physical Review A 64, 012310 (2001).

C. Fluhmann, T. L. Nguyen, M. Marinelli, V. Negnevitsky, K. Mehta, and J. P. Home, Encoding a Qubit in a Trapped-Ion Mechanical Oscillator, Nature 566, 513 (2019).

P. Campagne-Ibarcq et al., Quantum Error Correction of a Qubit Encoded in Grid States of an Oscillator, Nature 584, 368 (2020).

S. Takeda and A. Furusawa, Toward Large-Scale Fault-Tolerant Universal Photonic Quantum Computing, APL Photonics 4, 060902 (2019).

D. Su, C. R. Myers, and K. K. Sabapathy, Conversion of Gaussian States to Non-Gaussian States Using Photon-Number-Resolving Detectors, Physical Review A 100, 052301 (2019).

D. J. Weigand and B. M. Terhal, Generating Grid States from Schrodinger-Cat States without Postselection, Physical Review A 97, 022341 (2018).

M. Eaton, R. Nehra, and O. Pfister, Non-Gaussian and Gottesman-Kitaev-Preskill State Preparation by Photon Catalysis, New Journal of Physics 21, 113034 (2019).

Tzitrin, J. E. Bourassa, N. C. Menicucci, and K. K. Sabapathy, Progress towards Practical Qubit Computation Using Approximate Gottesman-Kitaev-Preskill Codes, Physical Review A 101, 032315 (2020).

G. Guzzinati, A. Béché, H. Lourenço-Martins, J. Martin, M. Kociak, and J. Verbeeck, Probing the Symmetry of the Potential of Localized Surface Plasmon Resonances with Phase-Shaped Electron Beams, Nature Communications 8, 14999 (2017).

Ben Hayun, O. Reinhardt, J. Nemirovsky, A. Karnieli, N. Rivera, and I. Kaminer, Shaping Quantum Photonic States Using Free Electrons, Science Advances 7, 4270 (2021).

V. di Giulio, O. Kfir, C. Ropers, and F. J. Garcia De Abajo, Modulation of Cathodoluminescence Emission by Interference with External Light, ACS Nano 15, 7290 (2021).

F. J. García De Abajo and V. di Giulio, Optical Excitations with Electron Beams: Challenges and Opportunities, ACS Photonics 8, 945 (2021).

Karnieli, N. Rivera, A. Arie, and I. Kaminer, The Coherence of Light Is Fundamentally Tied to the Quantum Coherence of the Emitting Particle, Science Advances 7, 8096 (2021).

O. Kfir, V. di Giulio, F. Javier García de Abajo, and C. Ropers, Optical Coherence Transfer Mediated by Free Electrons, Science Advances 7, 6380 (2021).

K. E. Priebe, C. Rathje, S. v. Yalunin, T. Hohage, A. Feist, S. Schäfer, and C. Ropers, Attosecond Electron Pulse Trains and Quantum State Reconstruction in Ultrafast Transmission Electron Microscopy, Nature Photonics 11, 793 (2017).

M. Vanacore, I. Madan, and F. Carbone, Spatio-Temporal Shaping of a Free-Electron Wave Function via Coherent Light-Electron Interaction, Rivista Del Nuovo Cimento 43, 567 (2020).

Madan, G. M. Vanacore, S. Gargiulo, T. LaGrange, and F. Carbone, The Quantum Future of Microscopy: Wave Function Engineering of Electrons, Ions, and Nuclei, Applied Physics Letters 116, 230502 (2020).

J. Verbeeck, A. Béché, K. Mü ller-Caspary, G. Guzzinati, M. A. Luong, and M. den Hertog, Demonstration of a 2 × 2 Programmable Phase Plate for Electrons, Ultramicroscopy 190, 58 (2018).

G. M. Vanacore et al., Ultrafast Generation and Control of an Electron Vortex Beam via Chiral Plasmonic near Fields, Nature Materials 18, 573 (2019).

A. H. Tavabi et al., Experimental Demonstration of an Electrostatic Orbital Angular Momentum Sorter for Electron Beams, Physical Review Letters 126, 094802 (2021).

O. Kfir, H. Lourenço-Martins, G. Storeck, M. Sivis, T. R. Harvey, T. J. Kippenberg, A. Feist, and C. Ropers, Controlling Free Electrons with Optical Whispering-Gallery Modes, Nature 582, 46 (2020).

R. Dahan et al., Resonant Phase-Matching between a Light Wave and a Free-Electron Wavefunction, Nature Physics 16, 1123 (2020).

V. Tsarev, A. Ryabov, and P. Baum, Free-Electron Qubits and Maximum-Contrast Attosecond Pulses via Temporal Talbot Revivals, Physical Review Research 3, 043033 (2021).

R. Dahan et al., Imprinting the Quantum Statistics of Photons on Free Electrons, Science 373, 7128 (2021).

J. W. Henke et al., Integrated Photonics Enables Continuous-Beam Electron Phase Modulation, Nature 600, 653 (2021).

O. Kfir, Entanglements of Electrons and Cavity Photons in the Strong-Coupling Regime, Physical Review Letters 123, 103602 (2019).

V. di Giulio, M. Kociak, F. J. G. de Abajo, and F. J. G. de Abajo, Probing Quantum Optical Excitations with Fast Electrons, Optica 6, 1524 (2019).

Kozak, T. Eckstein, N. Schönenberger, and P. Hommelhoff, Inelastic Ponderomotive Scattering of Electrons at a High-Intensity Optical Travelling Wave in Vacuum, Nature Physics 14, 121 (2018).

Talebi and C. Lienau, Interference between Quantum Paths in Coherent Kapitza-Dirac Effect, New Journal of Physics 21, 093016 (2019).

Reinhardt and I. Kaminer, Theory of Shaping Electron Wavepackets with Light, ACS Photonics 7, 2859 (2020)—Abstract.

S. v. Yalunin, A. Feist, and C. Ropers, Tailored High-Contrast Attosecond Electron Pulses for Coherent Excitation and Scattering, Physical Review Research 3, L032036 (2021).

V. v. Albert et al., Performance and Structure of Single-Mode Bosonic Codes, Physical Review A 97, 032346 (2018).

A. L. Grimsmo and S. Purí, Quantum Error Correction with the Gottesman-Kitaev-Preskill Code, PRX Quantum 2, 020101 (2021).

K. Fukui, A. Tomita, A. Okamoto, and K. Fujii, High-Threshold Fault-Tolerant Quantum Computation with Analog Quantum Error Correction, Physical Review X 8, 021054 (2018).

J. Eli Bourassa et al., Blueprint for a Scalable Photonic Fault-Tolerant Quantum Computer, Quantum 5, 392 (2021).

B. Q. Baragiola, G. Pantaleoni, R. N. Alexander, A. Karanjai, and N. C. Menicucci, All-Gaussian Universality and Fault Tolerance with the Gottesman-Kitaev-Preskill Code, Physical Review Letters 123, 200502 (2019).

Y. Yang, C. Roques-Carmes, S. E. Kooi, H. Tang, J. Beroz, E. Mazur, I. Kaminer, J. D. Joannopoulos, and M. Soljaićić, Observation of Enhanced Free-Electron Radiation from Photonic Flatband Resonances, arXiv:2110.03550 (2021).

M. Tsarev, A. Ryabov, and P. Baum, Measurement of Temporal Coherence of Free Electrons by Time—Domain Electron Interferometry, Physical Review Letters 127, 165501 (2021)—Abstract.

Jannis, K. Müller-Caspary, A. Béché, A. Oelsner, and J. Verbeeck, Spectroscopic Coincidence Experiments in Transmission Electron Microscopy, Applied Physics Letters 114, 143101 (2019).

C. Roques-Carmes, N. Rivera, J. D. Joannopoulos, M. Soljačić, and I. Kaminer, Nonperturbative Quantum Electrodynamics in the Cherenkov Effect, Physical Review X 8, 041013 (2018).

Reinhardt, C. Mechel, M. Lynch, and I. Kaminer, Free-Electron Qubits, Ann Phys 533, 2000254 (2021).

N. Fabre et al., Generation of a Time-Frequency Grid State with Integrated Biphoton Frequency Combs, Physical Review A 102, 012607 (2020).

D. Su, C. R. Myers, and K. K. Sabapathy, Conversion of Gaussian States to Non-Gaussian States Using Photon-Number-Resolving Detectors, Phys Rev A (Coll Park) 100, 052301 (2019).

G. Braiman, O. Reinhardt, O. Levi, C. Mechel, and I. Kaminer, The Synthetic Hilbert Space of Laser-Driven Free-Electrons, Conference on Lasers and Electro-Optics (2021), Paper FTh1N.6 FTh1N.6 (2021).

R. Ruimy, A. Gorlach, C. Mechel, N. Rivera, and I. Kaminer, Toward Atomic-Resolution Quantum Measurements with Coherently Shaped Free Electrons, Phys Rev Lett 126, (2021).

B. M. Terhal, J. Conrad, and C. Vuillot, Towards Scalable Bosonic Quantum Error Correction, Quantum Sci Technol 5, 043001 (2020).

(56) References Cited

OTHER PUBLICATIONS

S. Rosenblum et al., A CNOT Gate between Multiphoton Qubits Encoded in Two Cavities, Nature Communications 2018 9:1 9, 1 (2018).

* cited by examiner

200

202

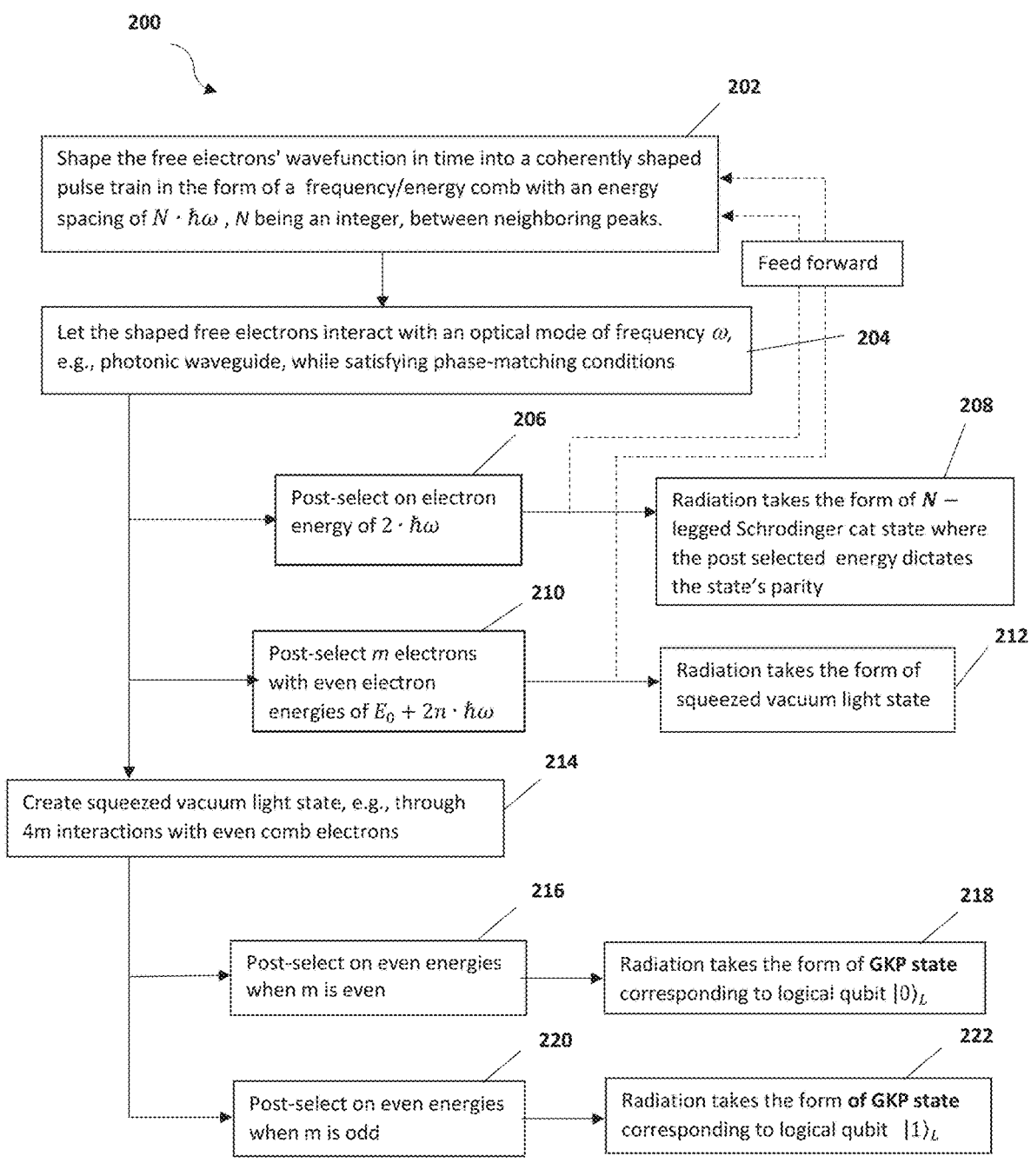

Shape the free electrons' wavefunction in time into a coherently shaped pulse train in the form of a frequency/energy comb with an energy spacing of $N \cdot \hbar\omega$, $N$ being an integer, between neighboring peaks.

Feed forward

Let the shaped free electrons interact with an optical mode of frequency $\omega$, e.g., photonic waveguide, while satisfying phase-matching conditions

204

206                                                                 208

Post-select on electron energy of $2 \cdot \hbar\omega$

Radiation takes the form of $N -$ legged Schrodinger cat state where the post selected energy dictates the state's parity

210

Post-select $m$ electrons with even electron energies of $E_0 + 2n \cdot \hbar\omega$

212

Radiation takes the form of squeezed vacuum light state

214

Create squeezed vacuum light state, e.g., through $4m$ interactions with even comb electrons 216                                                                 218

Post-select on even energies when m is even

Radiation takes the form of GKP state corresponding to logical qubit $|0\rangle_L$ 220                                                                 222

Post-select on even energies when m is odd

Radiation takes the form of GKP state corresponding to logical qubit $|1\rangle_L$

FIG. 2

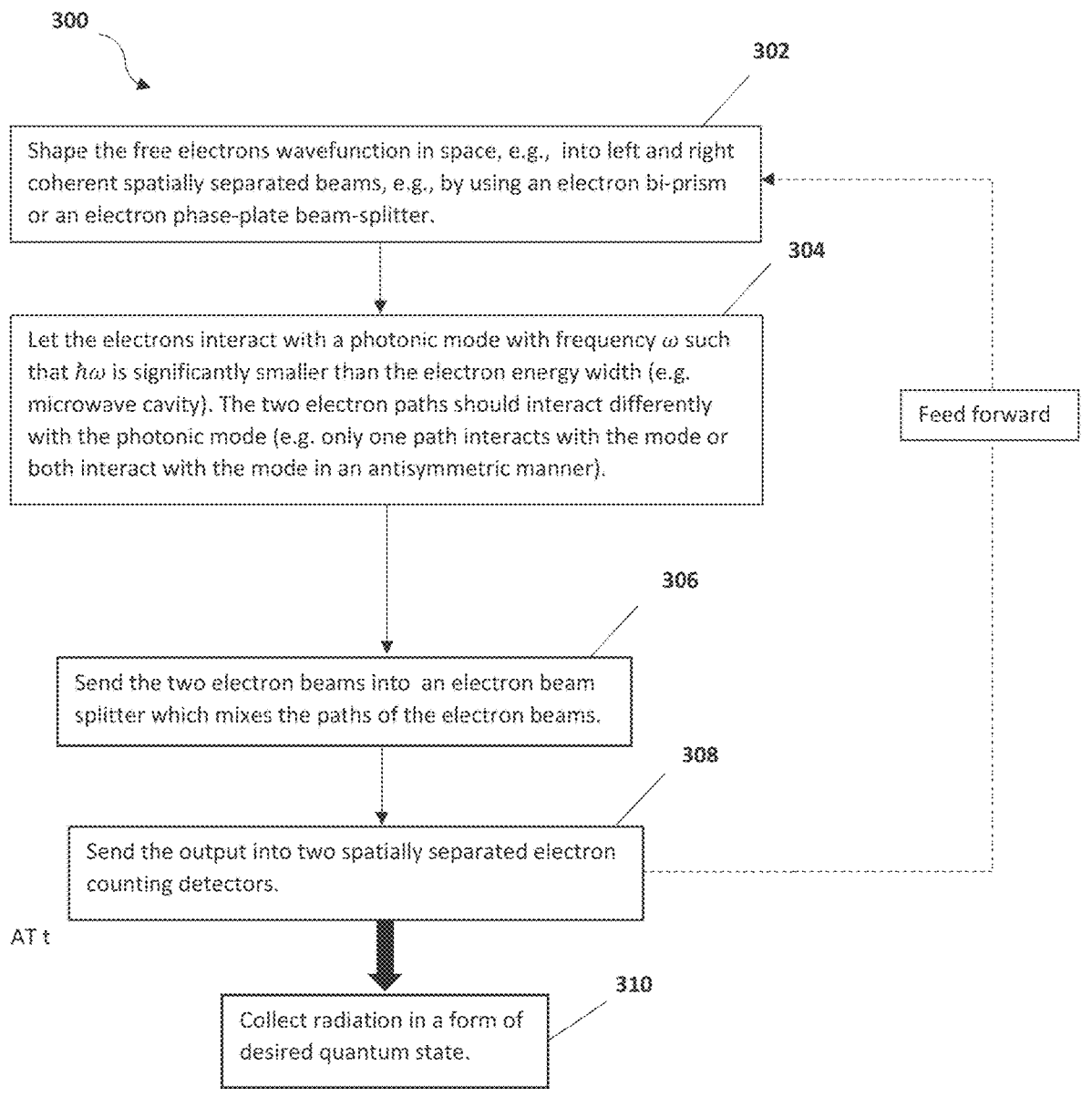

300

302

Shape the free electrons wavefunction in space, e.g., into left and right coherent spatially separated beams, e.g., by using an electron bi-prism or an electron phase-plate beam-splitter.

304

Let the electrons interact with a photonic mode with frequency $\omega$ such that $\hbar\omega$ is significantly smaller than the electron energy width (e.g. microwave cavity). The two electron paths should interact differently with the photonic mode (e.g. only one path interacts with the mode or both interact with the mode in an antisymmetric manner).

Feed forward

306

Send the two electron beams into an electron beam splitter which mixes the paths of the electron beams.

308

Send the output into two spatially separated electron counting detectors.

AT t

310

Collect radiation in a form of desired quantum state.

FIG. 3

FIG. 5A
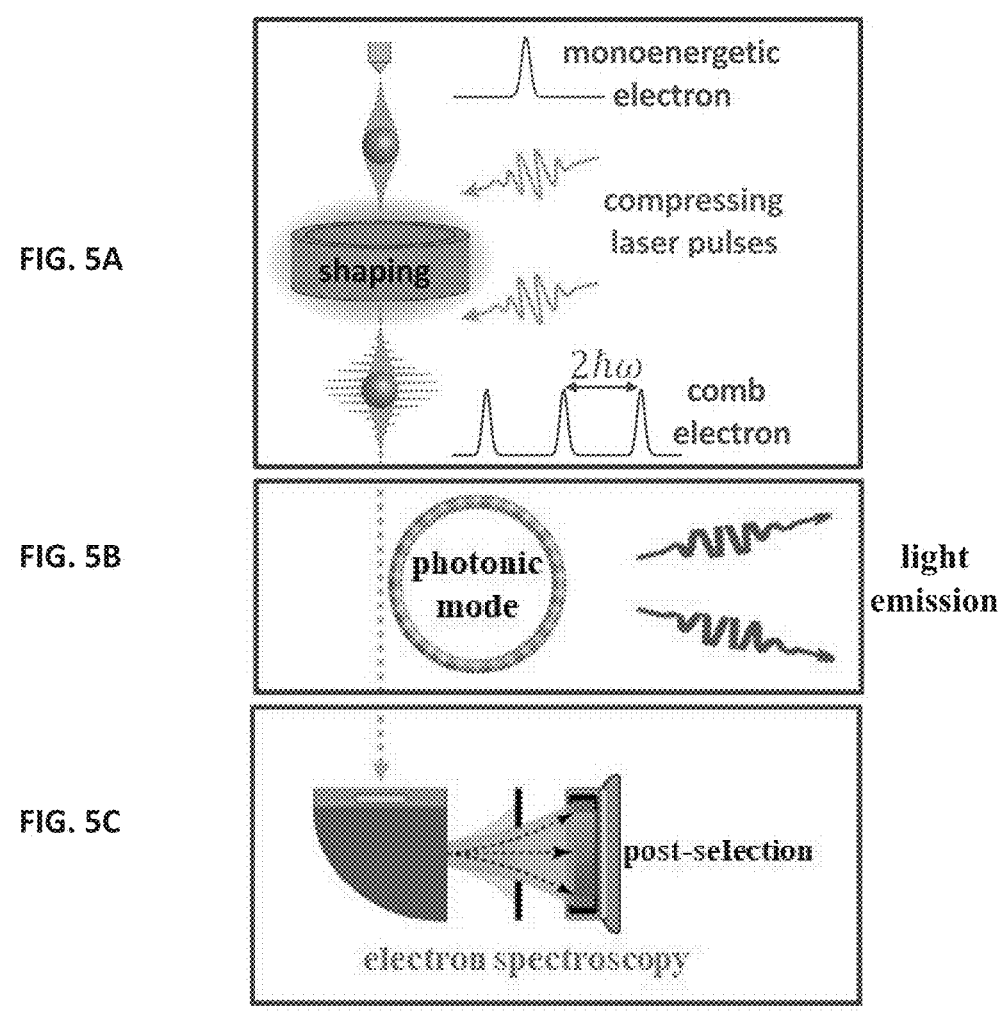
FIG. 5B
FIG. 5C
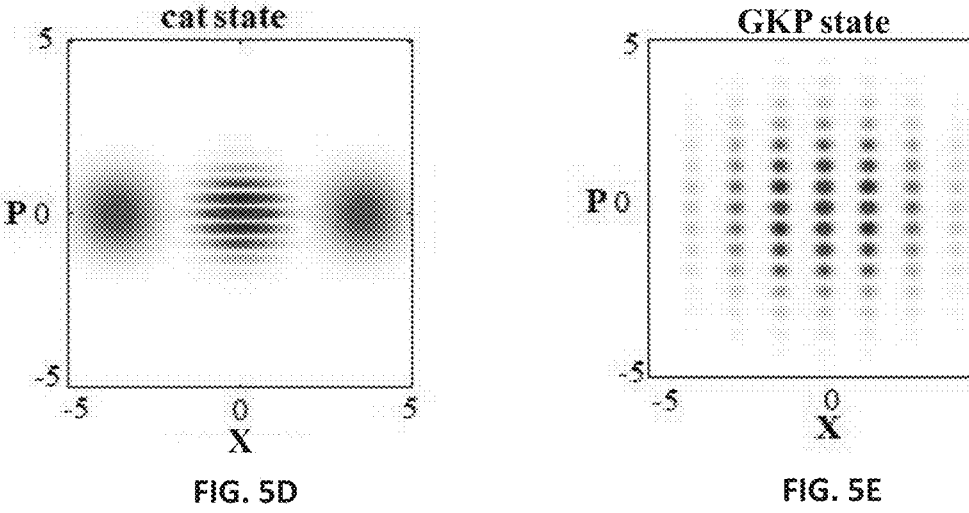
FIG. 5D
FIG. 5E pascal triangle
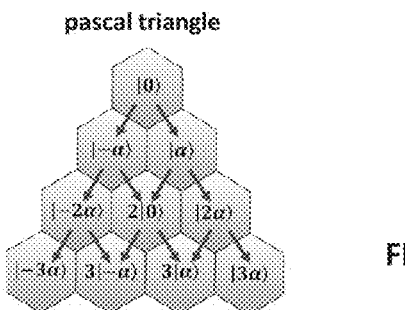
FIG. 8C
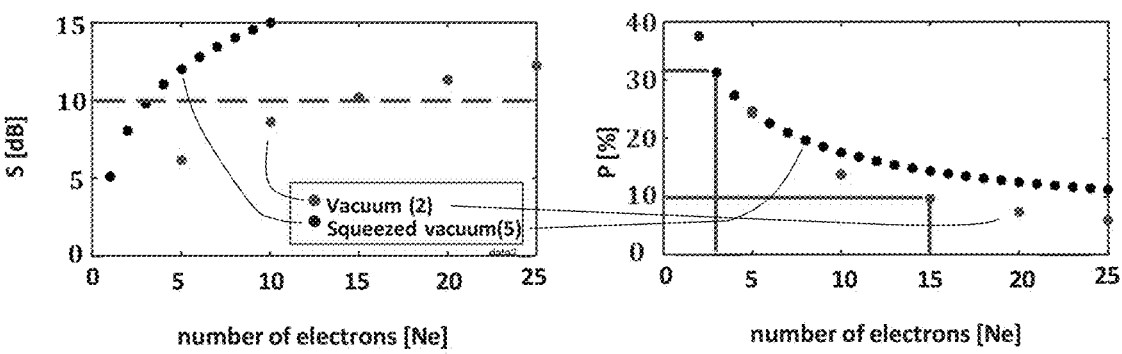
number of electrons [Ne]
FIG. 8D
number of electrons [Ne]
FIG.8E
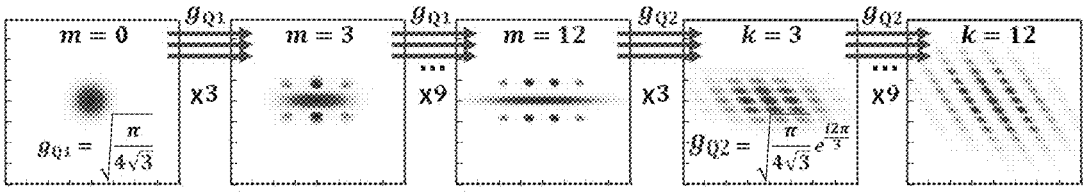
FIG. 9A
FIG. 9B

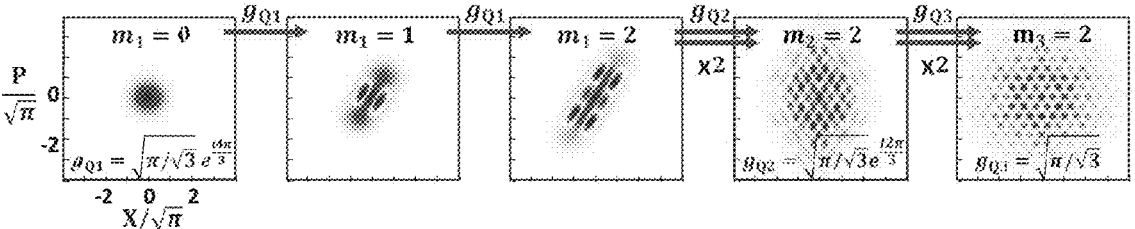
FIG. 9C
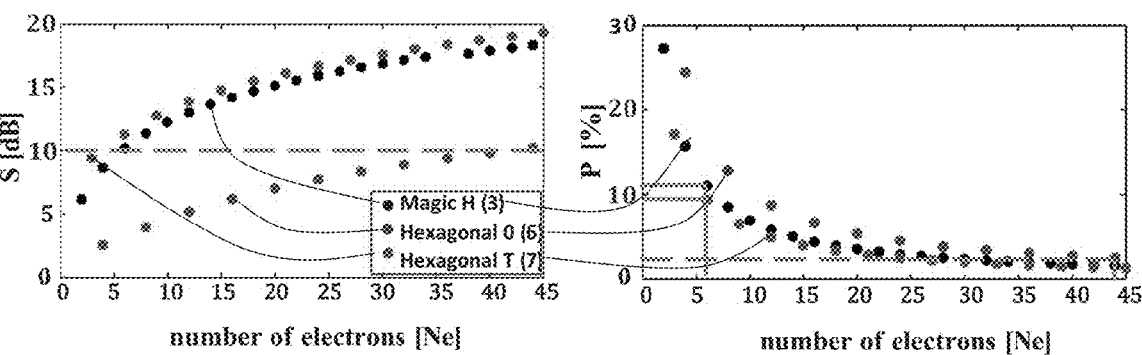
FIG. 9D                                   FIG. 9E

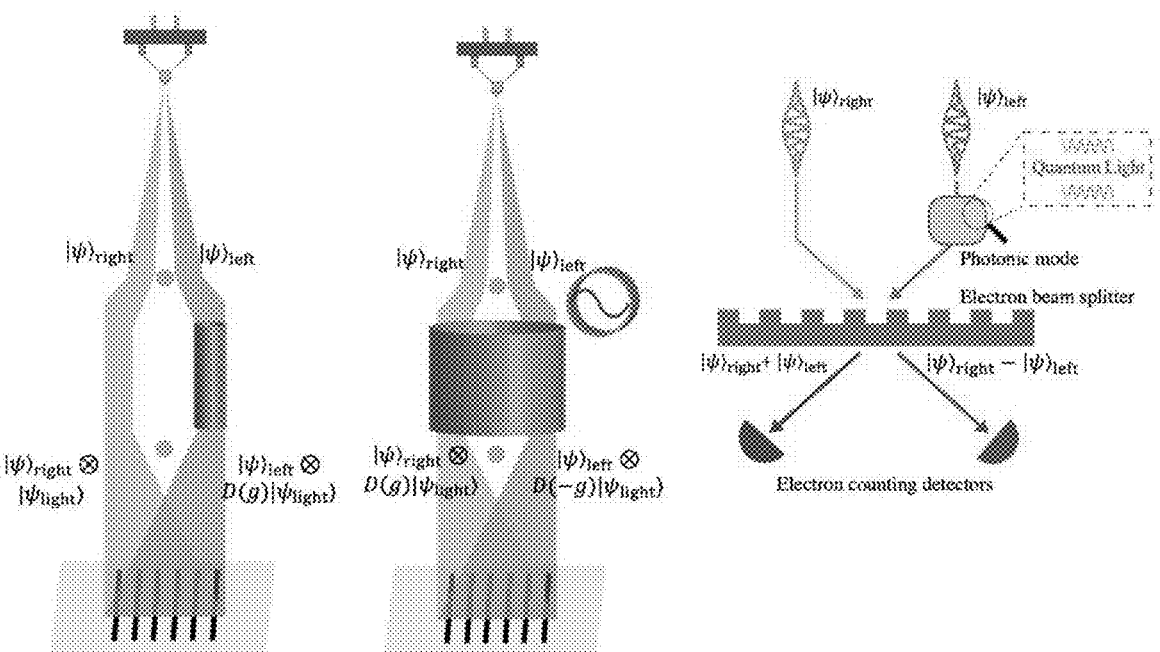
FIG. 10A          FIG. 10B                    FIG. 10C $$|\psi\rangle_e \;-\boxed{S(g_Q)}- \qquad |\psi\rangle_e \;-\boxed{H}-\!\!\bullet\!\!-\boxed{H}-$$
$$|\psi\rangle_{ph}^{GKP}\,-\boxed{S(g_Q)}- \;=\; |\psi\rangle_{ph}^{GKP}\,-\boxed{CD(2g_Q)}-\boxed{D(-g_Q)}-$$

$$|\psi\rangle_e \;-\boxed{FSP}- \;=\; |\psi\rangle_e \;-\boxed{R_z\!\left(\frac{\pi}{2}\right)}-$$

$$|\psi\rangle_e \;-\boxed{PINEM(g)}- \;=\; |\psi\rangle_e \;-\boxed{R_z(4\ln(g))}-$$

FIG. 11C

FIG. 12A    Readout $$|0\rangle_e \;-\boxed{S\!\left(\frac{a_z}{4}\right)}-\boxed{\angle}-$$
$$|\psi\rangle_{ph}^{GKP}\,-\boxed{S\!\left(\frac{a_z}{4}\right)}-\boxed{D\!\left(-\frac{a_z}{4}\right)}- \;=\; |\psi\rangle_{ph}^{GKP}\,-\boxed{\angle}-$$

FIG. 12B    $T$ gate $$|0\rangle_e \;-\boxed{S\!\left(\frac{a_z}{4}\right)}-\boxed{U\!\left(\frac{\pi}{4}\right)}-\boxed{\angle}-$$
$$|\psi\rangle_{ph}^{GKP}\,-\boxed{S\!\left(\frac{a_z}{4}\right)}-\boxed{\sigma_z}- \;=\; |\psi\rangle_{ph}^{GKP}\,-\boxed{T}-$$

FIG. 12C    $R_i(\phi)$ gate $$|0\rangle_e \;-\boxed{S\!\left(\frac{a_i}{4}\right)}-\boxed{U(\phi)}-\boxed{\angle}-$$
$$|\psi\rangle_{ph}^{GKP}\,-\boxed{S\!\left(\frac{a_i}{4}\right)}-\boxed{\sigma_i}- \;=\; |\psi\rangle_{ph}^{GKP}\,-\boxed{R_i(\phi)}-$$

GENERATION OF QUANTUM LIGHT STATES

TECHNOLOGICAL FIELD

The technique of the present disclosure is in the field of quantum engineering and relates to a system and method for generation of quantum light states.

BACKGROUND ART

References considered to be relevant as background to the presently disclosed subject matter are listed below:

1. D Gottesman, A. Kitaev, and J. Preskill, Encoding a Qubit in an Oscillator, Physical Review A 64, 012310 (2001).
2. C. Hithmann, T. L. Nguyen, M. Marinelli, V. Negnevitsky, K. Mehta, and J. P. Home, Encoding a Qubit in a Trapped-Ion Mechanical Oscillator, Nature 566, 513 (2019).
3. P. Campagne-Ibarcq et al, Quantum Error Correction of a Qubit Encoded in Grid States of an Oscillator, Nature 584, 368 (2020).
4. S. Takeda and A. Furusawa, Toward Large-Scale Fault-Tolerant Universal Photonic Quantum Computing, APL Photonics 4, 060902 (2019).
5. D. Su, C. R. Myers, and K. K. Sabapathy, Conversion of Gaussian States to Non-Gaussian States Using Photon-Number-Resolving Detectors, Physical Review A 100, 052301 (2019).
6. D. J. Weigand and B. M. Terhal, Generating Grid States from Schrödinger-Cat States without Postselection, Physical Review A 97, 022341 (2018).
7. M. Eaton, R. Nehra, and O. Pfister. Non-Gaussian and Gottesman-Kitaev-Preskill State Preparation by Photon Catalysis, New Journal of Physics 21, 113034 (2019).
8. Tzitrin, J. E. Bourassa, N. C. Menicucci, and K. K. Sabapathy, Progress towards Practical Qubit Computation Using Approximate Gottesman-Kitaev-Preskill Codes, Physical Review A 101, 032315 (2020).
9. G. Guzzinati, A. Béche, H. Lourenco-Martins, J. Martin, M. Kociak, and J. Verbeeck, Probing the Symmetry of the Potential of Localized Surface Plasmon Resonances with Phase-Shaped. Electron Beams, Nature Communications 8, 14999 (2017).
10. Ben Hayun, O. Reinhardt, J. Nemirovsky, A. Kamieli, N. Rivera, and I. Kaminer, Shaping Quantum Photonic States Using Free Electrons, Science Advances 7, 4270 (2021).
11. V. di Giulio, O. Kfir, C. Ropers, and F. J. Garcia De Abajo, Modulation of Cathodoluminescence Emission by Interference with External Light, ACS Nano 15, 7290 (2021).
12. F. J. Garcia De Abajo and V. di Giulio, Optical Excitations with Electron Beams: Challenges and Opportunities, ACS Photonics 8, 945 (2021).
13. Karnieli, N. Rivera, A. Arie, and I. Kaminer, The Coherence of Light Is Fundamentally Tied to the Quantum Coherence of the Emitting Particle, Science Advances 7, 8096 (2021).
14. O. Kfir, V. di Giulio, F. Javier Garcia de Abajo, and C. Ropers, Optical Coherence Transfer Mediated by Free Electrons, Science Advances 7, 6380 (2021).
15. K. E. Priebe, C. Rathje, S. v. Yalunin, T. Hohage, A. Feist, S. Schäfer, and C. Ropers, Attosecond. Electron Pulse Trains and Quantum State Reconstruction in Ultrafast Transmission Electron Microscopy, Nature Photonics 11, 793 (2017).
16. M. Vanacore, I. Madan, and F. Carbone, Spatio-Temporal Shaping of a Free-Electron Wave Function via Coherent Light—Electron Interaction, Rivista. Del Nuovo Cimento 43, 567 (2020).
17. Madan, O. M. Vanacore, S. Gargiulo, T. LaGrange, and F. Carbone, The Quantum Future of Microscopy: Wave Function Engineering of Electrons, Ions, and Nuclei, Applied Physics Letters 116, 230502 (2020).
18. J. Verbeeck, A. Béché, K. Müller-Caspary, G. Guzzinati, M. A. Luong, and M. den Hertog, Demonstration of a 2×2 Programmable Phase Plate for Electrons, Ultramicroscopy 190, 58 (2018).
19. G. M. Vanacore et al., Ultrafast Generation and Control of an Electron Vortex Beam via Chiral Plasmonic near Fields, Nature Materials 18, 573 (2019).
20. A, H. Tavabi et al., Experimental Demonstration of an Electrostatic Orbital Angular Momentum Sorter for Electron Beams, Physical Review Letters 126, 094802 (2021).
21. O. Kfir, H. Lourenco-Martins, G. Storeck, M. Sivis, T. R. Harvey, T. J. Kippenberg, A. Feist. and C, Ropers, Controlling Free Electrons with Optical Whispering-Gallery Modes, Nature 582, 46 (2020).
22. R. Dahan et al., Resonant Phase-Matching between a Light Wave and a Free-Electron Wavefunction, Nature Physics 16, 1123 (2020).
23. v. Tsarev, A. Ryabov, and P. Baum, Free-Electron Qubits and Maximum-Contrast Attosecond Pulses via Temporal Talbot Revivals, Physical Review Research 3, 043033 (2021)
24. R. Dahan et al., Imprinting the Quantum Statistics of Photons on Free Electrons, Science 373, 7128 (2021).
25. J. W. Menke et al., Integrated Photonics Enables Continuous-Beam Electron Phase Modulation, Nature 600, 653 (2021).
26. O. Kfir, Entanglements of Electrons and Cavity Photons in the Strong-Coupling Regime, Physical Review Letters 123, 103602 (2019).
27. V. di Giulio, M. Kociak, F. J. G. de Abajo, and F. J. G. de Abajo, Probing Quantum Optical Excitations with Fast Electrons, Optica 6, 1524 (2019).
28. Kozák, T, Eckstein, N. Schönenberger, and P. Hommelhoffi Inelastic Ponderomotive Scattering of Electrons at a High-Intensity Optical Travelling Wave in Vacuum, Nature Physics 14, 121 (2018).
29. Talebi and C, Li enau, Interference between Quantum Paths in Coherent Kapitza-Dirac Effect, New Journal of Physics 21, 093016 (2019).
30. Reinhardt and I. Kaminer, Theory of Shaping Electron Wavepackets with Light, ACS Photonics 7, 2859 (2020).
31. S. v. Yalunin, A. Feist, and C. Ropers, Tailored High-Contrast Attosecond Electron Pulses for Coherent Excitation and Scattering, Physical Review Research 3, L032036 (2021).
32. V. v. Albert et al., Performance and Structure of Single-Mode Bosonic Codes, Physical Review A 97, 032346 (2018).
33. A. L. Grimsmo and S. Puri, Quantum Error Correction with the Gottesman-Kitaev-Preskill Code, PRX Quantum 2, 020101 (2021).

34. K. Fukui, Tornita, A. Okamoto, and K. Fujii, High-Threshold Fault-Tolerant Quantum Computation with Analog Quantum Error Correction, Physical Review X 8, 021054 (2018).

35. J. Eli Bourassa et al., Blueprint for a Scalable Photonic Fault-Tolerant Quantum Computer, Quantum 5, 392 (2021).

36. B. Q. Baragiola, G. Pantaleoni, R. N. Alexander, A. Karanjai, and N. C. Menicucci, AU-Gaussian Universality and Fault Tolerance with the Gottesman-Kitaev-Preskill Code, Physical Review Letters 123, 200502 (2019).

37. Y. Yang, C. Roques-Carmes, S. E. Kooi, H. Tang, J. Beroz, E. Mazur, I. Kaminer, J. D. Joannopoulos, and M. Soljačić, Observation of Enhanced Free-Electron Radiation from Photonic Flatband Resonances, arXiv: 2110.03550 (2021).

38. M. Tsarev, A. Ryabov, and P. Baum, Measurement of Temporal Coherence of Free Electrons by Time-Domain Electron Interferometry, Physical Review Letters 127, 165501 (2021).

39. Jannis, K. Müller-Caspary, A. Béché, A. Oelsner, and J. Verbeeck, Spectroscopic Coincidence Experiments in Transmission Electron Microscopy, Applied Physics Letters 114, 143101 (2019).

40. C. Roques-Carmes, N. Rivera, J. D. Joannopoulos, M. Soljačić, and I. Kaminer, Nonperturbative Quantum Electrodynamics in the Cherenkov Effect, Physical Review X 8, 041013 (2018).

41. Reinhardt, C. Mechel, M. Lynch, and I. Karniner, Free-Electron Qubits, Ann Phys 533, 2000254 (2021).

42. N. Fabre et al., Generation of a Time-Frequency Grid State with Integrated Biphoton Frequency Combs, Physical Review A 102, 012607 (2020).

43. D. Su, C. R. Myers, and K. K. Sabapathy, Conversion of Gaussian States to Non-Gaussian States Using Photon-Number-Resolving Detectors, Phys Rev A (Coll Park) 100, 052301 (2019).

44. G. Braiman, O. Reinhardt, O. Levi, C. Mechel, and I. Kaminer, The Synthetic Hilbert Space of Laser-Driven Free-Electrons, Conference on Lasers and Electro-Optics (2021), Paper FfhlN.6 FTh1N.6 (2021).

45. R. Ruimy, A. Gorlach, C. Mechel, N. Rivera, and I. Kaminer, Toward Atomic-Resolution Quantum Measurements with Coherently Shaped Free Electrons, Phys Rev Lett 126, (2021).

46. B. M. Terhal, J. Conrad, and C. Vuillot, Towards Scalable Bosonic Quantum Error Correction, Quantum Sci Technol 5, 043001 (2020).

47. S. Rosenblum et al., A CNOT Gate between Multiphoton Qubits Encoded in Two Cavities, Nature Communications 2018 9:1 9, 1 (2018).

Acknowledgement of the above references herein is not to be inferred as meaning that these are in any way relevant to the patentability of the presently disclosed subject matter.

BACKGROUND

The rapid development of quantum technologies created a high demand for the generation of specific quantum states. A key place in quantum technologies is occupied by cat states and coherent grids states, which can be used for fault-tolerant photon quantum computations. Different proposed mechanisms to generate such non-Gaussian states rely on optical Kerr effects or measurement-based schemes, like photon subtraction or homodyne measurements of Fock states. Recently, such non-Gaussian states as cat and Gottesman-Kitaev-Preskill (GKP) states were demonstrated in radiofrequency using RF-cavities transmons and ions. However, such demonstrations were held back in the optical frequency range due to the relatively weaker nonlinearity.

The field is rapidly evolving with new demonstrations for generating quantum states by coupling the optical mode to an ion or atom. However, all such methods are limited by spectral range, small fidelities, or low generation rates. More specifically:

With regards to spectral range, the current methods use RF-cavities transmons and ions to create GKP states. All these methods are limited by spectral range from radio frequencies to microwaves. In optical and X-ray range current methods were held back by too weak nonlinearities, which are necessary for these methods.

The small generation rates achievable by the current methods are associated with the limitation of these methods by the intensity of the created non-Gaussian states of light, which relates to weak nonlinearities.

As for the small fidelities, the current methods are capable of creating the desired quantum light states only approximately (i.e., with small fidelity). This is connected to weak nonlinearities or small creation probabilities in post-selected schemes. Specifically, the nonlinear regime necessary for the deterministic creation of light was not demonstrated yet. Measurement-based schemes based on post-selection were shown in limited cases, and so far, GKP states with the required squeezing level were not achieved. Another limitation of measurement schemes is that usually, they require photon number resolving detectors, which are currently too slow for feedforward operations.

GENERAL DESCRIPTION

The present disclosure provides a novel technique of creation/generation of non-Gaussian quantum states of light based on the interactions between free particles (such as electrons, ions, atoms, photons, molecules) and optical/photonic modes.

As mentioned above, it is known to generate such non-Gaussian states as cat and GKP in radiofrequency using RF-cavities transmons and ions. Current theoretical proposals for the generation of optical GKP states (i.e. in frequencies higher than IR) rely on optical Kerr effects, cavity electrodynamics (QED), homodyne measurements of cat states [6], or measurement-based schemes that require photon-number-resolving detection [5,7,8]. However, all these optical schemes are currently limited to the generation of just a few photons with low fidelities, because they rely on the intrinsically weak optical nonlinearities or on low post-selection probabilities. This is why no optical experiment so far has reached a non-Gaussian state of sufficient photon-number and sufficient squeezing to be usable for continuous variable (CV) quantum computation. Despite the difficulties in creating optical GKP states, there is an ongoing intense search for new mechanisms to generate them and unlock their prospects for photonic quantum technologies.

The technique of the present disclosure exploits interactions between free particles (e.g., electrons) and photonic structure(s) to generate such photonic states as GKP states and other non-Gaussian states that can be used in fault-tolerant quantum computing. The approach of the present disclosure provides control over the quantum state being generated by utilizing pre-shaping of the particle (e.g., electron) wavefunction before interaction (i.e., radiation emission by the particle) and a post-selecting procedure with respect to the electron parameters afterward.

It is generally known that post-selection on shaped free electrons alters the properties of their emission. According to the present disclosure, the post selection procedure may be a feedback-based procedure utilizing the analysis of the electron parameters after the interaction to determine the corresponding photonic state to be selected (as being the correct/desired one), or feed forward based post-selection procedure utilizing the analysis of the electron parameters after the interaction to selectively adjust the pre-shaping parameters/conditions to obtain the desired state in a next interaction session.

It should be noted that the technique of the present disclosure may be embodied using other elementary particles, besides electrons and using other methods of interaction as will be described further below. However, for clarity, the non-limiting implementation with free electrons will be described in detail. The technique of the present disclosure utilizes a shaped pulse of free particles to create and manipulate the quantum properties of a photonic mode, e.g. quantum harmonic oscillator, such as photonic mode inside a waveguide or cavity, or more generally, any mode of photonic quasiparticles such as phonons, phonons-polaritons, and plasmons.

Generally, different quantum photonic states that can be generated by the technique of the present disclosure include the superposition of Gaussian states. Some of the examples of such states include cat states, squeezed vacuum, and coherent grid states (e.g. GKP states). The inventors have shown that the technique of the present invention is capable of generating such quantum photonic states with fidelity >95%, with the probability of success ~30% in the range of frequencies from radiofrequency to X-ray.

Specifically, the inventors have shown how the free particles with properly shaped wavefunction in space or time can enable the generation of conditional displacement operators and additional, other non-Gaussian operators. Such operators enable the construction of Schrödinger cat and GKP light states, exemplified here in a specific implementation scheme. Since a charged particle can interact with light of arbitrary frequency, the technique of the present disclosure overcomes limitations on the frequency range. It can create cat states from microwave to X-ray frequencies. Furthermore, the technique of the present disclosure can be generalized and implemented in various physical systems, from free-electron lasers to optomechanical cavities.

In fact, the realization of conditional displacement operator can enable the approximation of any quantum state of light. The technique of the present disclosure enables the generation of additional non-Gaussian operators which can enable to generate specific states of light even more efficiently. As will be described below, the inventors have specifically described generation of cat, squeezed vacuum and GKP states using energy modulation. All these schemes are applicable in frequencies where the photon energy is comparable or higher than the free electron energy spread, which is everywhere from the IR into the optical, UV and X-ray ranges. The inventors have shown how the enemy modulation enables the generation of the conditional displacement operator which is the underlying required physical tool behind all these schemes, and how space-modulation of free electrons enables the generation of such conditional displacement operator in the complete opposite end of the spectrum, when the photon energy is smaller than the free electron energy spread (i.e., THz, microwave and radio frequencies), enabling the extension of the generation schemes to virtually the entire electromagnetic spectrum.

It should also be noted that quantum error correction is essential for reaching large-scale quantum computation. One prominent approach toward this goal is to encode qubit information on continuous variables of a quantum harmonic oscillator. These codes, and most prominently the GKP code, facilitate quantum error correction for fault-tolerant quantum computation with continuous variables [4]. The generation and manipulation of GKP states is a formidable task, as it necessitates non-Gaussian operations which require strong nonlinearities or post-selection measurements. There is a wide range of physical mechanisms investigated for creating the required nonlinearity. The nonlinearity can arise from intrinsically non-quadratic Hamiltonians that can be realized using Kerr effect or using number-resolving photonic measurements [8]. Also, GKP states can be deterministically generated from cat states [6]. However, the generation of initial cat states requires on itself nonlinearity.

An alternative source of nonlinearity for generating and manipulating GKP states is coupling to a matter ancilla qubit, which provides the necessary strong nonlinearity. Such scheme was recently suggested in cavity QED. Other such schemes were demonstrated experimentally with the vibrational motion of trapped ions [2], and light at microwave frequencies coupled to superconducting qubits [3].

The present disclosure presents a different physical mechanism based on the fundamental coherent interaction of free particles (e.g., electrons) and photons to provide the building blocks for universal quantum computing with GKP states and quantum error correction. This interaction can be used in gate-based and measurement-based computational protocols. This technique relies on the basic interaction of two fundamental particles, e.g., free electrons, and photon. This interaction provides the strong nonlinearity needed to control GKP states. The technique of the present disclosure provides for GKP states generation from such interaction and also the universality of this process and error correction. This interaction can be described as a conditional displacement operator (CD) in the joint electron-photons Hilbert space. The technique of the present disclosure replaces the matter ancilla qubit with a coherently shaped free electron. This operator can be a building block to create any arbitrary unitary operation in the combined Hilbert space.

The technique of the present disclosure relies on the inelastic scattering of free electrons by electromagnetic fields. This nonlinear scattering provides the additional degrees of freedom required to encode quantum information on the individual electron by coherent modulation of its wavefunction.

The use of free electrons as matter ancilla qubits is intriguing for a few practical reasons. Free electrons are versatile in their energy spectrum, and so can potentially access frequencies from the microwave to the optical (and potentially higher) range. This versatility enables to utilize this property in the optical range.

Moreover, the free electrons are fundamentally different than previously purposed matter ancilla qubits because they are flying qubits meaning that they only couple temporarily to the photonic mode, before they continue propagating. In contrast, the permanent coupling between the matter qubit and the photonic mode in other systems leads to inherent decoherence channels and non-linearities such as self-Kerr that are harmful to GKP states. Another advantage provided by the electrons being flying qubits is that they naturally facilitate coupling between spatially separated photonic modes, which enable the generation of multipartite highly entangled states such Greenberger-Home-Zeilinger (GHZ)

states and cluster states [32], important resources for quantum computation and communication.

Thus, according to one broad aspect of the invention, it provides a photonic quantum state generator configured and operable to generate one or more predetermined photonic quantum states in a range from radiofrequency to X-ray, comprising:

a free particles source controllably operable to provide a flow of said free particles with predetermined one or more flow parameters;

a shaping unit located in a vicinity of a flow of the free particles and configured and operable to apply wavefunction shaping to provide coherently shaped free particles in either one of time-energy domain or space-momentum domain;

an interaction unit comprising a photonic structure and defining an interaction region enabling m interactions (m≥1) between a photonic mode within said interaction region and the flow of the coherently shaped free particles having said one or more flow parameters satisfying a phase-matching condition with respect to the photonic mode, thereby generating said one or more predetermined photonic quantum states by a conditional displacement mechanism.

The generator further comprises a control system comprising: a post-interaction measurement unit configured and operable to perform a number resolving post-interacting measurement of the free particles emerging from the interaction region, and generating measured data indicative of at least one parameter of the free particles after the interaction. This at least one parameter comprises one of the following: energy for the coherently shaped free particle in the time-energy domain, and a position in space for the coherently shaped free particle in the space-momentum domain.

In some embodiments, the control unit comprises a first post-selection unit configured and operable to analyze the measured data and determine corresponding photonic quantum states being generated as result of the interactions with the flow of the coherently shaped free particles, enabling feedback post-selection mode for selecting desired photonic quantum states.

Alternatively or additionally, the control unit comprises a second post-selection unit configured and operable to analyze the measured data and determine corresponding photonic quantum states being generated as result of the interactions with the flow of the coherently shaped free particles, enabling feedforward operation of the shaping unit to selectively adjust parameters conditions of the flow of the coherently shaped free particles to obtain the desired state in a next interaction session.

The shaping unit is configured and operable to shape the wavefunction to be coherently shaped in energy in the form of an energy comb, or in time in a form of a pulse train. Preferably, the coherently shaped pulse train has an energy spectrum in the form of a series of peaks with equal energy spacing $N \cdot \hbar \omega$ between neighboring peaks, where $\omega$ is a frequency of said photonic mode defined by said photonic structure, and N is an integer N≥2. Such a coherently shaped pulse train, while interacting with the photonic mode, generates radiation in the form of a superposition of N coherent photonic states of different phases.

Specifically, the inventors conducted simulations and experiments using energy-comb electrons as a natural basis for controlling the photonic states created via the interaction. A free-electron comb is a superposition of electron energy eigenstates in which the energies form an evenly spaced ladder, analogously to an optical frequency comb of evenly spaced frequencies. The inventors have shown how cat states and multi-component cat states can be heralded by the post-selection procedure, e.g. energy measurement of comb electrons after the interaction. Consequent interactions of multiple comb electrons with appropriate post-selections create more complex photonic states such as the GKP state. The inventors have found that the post-selection probability to produce a GKP state of 10 dB squeezing is >10%, bearing comparison with current leading theoretical proposals for the creation of optical GKP states [5-8]. Further, the inventors present more advanced schemes that increase the probability to >30% by "seeding" the electron radiation process with a squeezed vacuum state that can be generated using spontaneous parametric processes. Finally, the inventors demonstrate how the interactions with comb electrons can apply gates on the GKP states, for example, performing a conditional rotation that entangles two photonic modes into a GKP Bell state—an important step toward the vision of GKP cluster states for fault-tolerant quantum computation.

In some embodiments, the shaping unit comprises an electromagnetic field source applying an electromagnetic field onto the free particles having a frequency $F_{EM}$ in a predetermined relation with a frequency of $F_{RS}$ of said photonic mode, thereby producing said coherently shaped pulse train. In some embodiments, this relation satisfies the condition: $F_{EM} = N \cdot F_{RS}$.

In some embodiments, the energy peaks may also be of substantially equal amplitudes and of approximately linear phase relation.

It should be understood that the relative quantum phase between the different photonic states corresponds to the desired photonic states to be obtained and can be controlled by measurement of the energy spectrum of the free particle after said interaction (referred to hereinbelow as "post-selection" of electron energy).

The value of N is selected in accordance with the one or more predetermined photonic quantum states to be generated, such that the energy spacing in the coherent pulse train includes a selected number of k-shifted energy states with a $\hbar \omega$ shift, where k is an integer from 0 to (N−1).

The post-interaction measurement unit preferably includes a spectrometer configured and operable to perform number and energy resolving post-interacting measurement to provide measured data indicative of an energy change of the free particle after said interaction with the photonic mode, thereby controlling the photonic quantum states being generated.

In some embodiments, the shaping unit is configured and operable to shape the wavefunction to be coherently shaped in a firm of two or more spatially separated beams of free particles. In these embodiments and in the case of electrons, the shaping unit comprises at least one electron beam splitter unit which comprises any one of electron bi-prism or electron phase-plate to thereby provide said two or more spatially separated beams of free particles. In these embodiments, the post-interaction measurement unit comprises an additional beam splitter operation configured to interfere the two or more spatially separated beams of electrons and electron counting camera configured and operable to perform the number resolving measurement and providing the measured data indicative of the spatial trajectory change of the electrons after the interaction with the photonic mode and with the additional post interaction beam splitter/combiner, thereby enabling controlling the photonic quantum states being generated.

As mentioned above, the free particles may be charged particles (such as electrons, ions) or photons, atoms, molecules In the case of molecules and atoms, these particles can be stationary (not moving) like quantum dots or NV centers. It should be understood that in such case, the energy shaping of the particles (atoms/molecules) to generate coherently shaped pulse train and the interaction of said coherently shaped pulse train with the photonic mode are implemented within the same structure, which may be a resonating structure (e.g. waveguide).

Generally, the photonic mode containing structure may or may not be a resonating structure, and the latter may or may not include a non-linear medium. For example, the structure may be configured as an optomechanical system or electro-optical system; or as a waveguide, cavity, or photonic nanostructure.

In some embodiments, a free-electron laser system can be used to define said free particles' source and a source of the electromagnetic field.

In some embodiments, the photonic quantum state generator is a single structure (e.g. waveguide) operable to perform the functions of both the particles' energy shaping unit and the photonic mode containing interaction medium. Such a structure may be exposed to the laser pulses from an external laser source.

In some embodiments, predetermined photonic quantum states correspond to information qubits. For example, the invention provides a quantum computing system including the above described photonic states generator.

It should be noted that the system (photonic quantum generator) can operate the photonic state that is initially squeezed in the structure (e.g. resonating cavity), e.g. to create coherent grid states with a higher probability; as well as can be adapted to squeeze the initial state even more without using any post-selection.

The technique of the present invention of creating quantum light has several advantages. More specifically: free particles can be designed to interact strongly within a wide range of frequencies (from radio frequencies up to X-ray). Considering electrons as free particles, they are easy to detect efficiently and measure their energy spectrum. This significantly improves the fidelity of the measurements and thus the fidelity of the created light.

The technique of the present disclosure can advantageously provide a simple and effective photonic states generator which utilizes only electrons, their post-selection, and a cavity (or waveguide) to create various non-Gaussian states.

The photonic quantum states produced by the techniques of the present disclosure include superposition of Gaussian states comprising one or more of the following: cat states, squeezed vacuum light states, and coherent grid states. The coherent grid states comprise Gottesman-Kitaev-Preskill (GKP) states.

The GKP states are generated with above 10 dB squeezing and fidelities above 90% at post-selection probability of 10%. When initially squeezed vacuum states are used to generate GKP states, the post-selection probability is above 30%.

Due to the spatial resolution of the electrons, the creation of quantum light, using the method of the invention, can be significantly miniaturized, enabling the creation of quantum light at nanometer scales.

Considering the feedforward post-selection mode, the generator system provides for performing arbitrary single qubit gates on Gottesman-Kitaev-Preskill (GKP) quantum photonic states being generated, as well as quantum error correction on the GKP state in the photonic mode.

The generator according to the present disclosure is capable of providing entanglement between multiple GKP states using the interaction between a single electron qubit with multiple photonic modes. The interaction with multiple GKP states can provide two qubit gates between two GKP states. The interaction with multiple GKP states can provide entangled multi qubits states, comprising GHZ and/or cluster state.

The present disclosure also provides a quantum computing system comprises the above-described generator.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 2 is a flow diagram describing an exemplary method of creating photonic quantum states from free electrons by modulating the electron into energy comb;

FIG. 3 is a flow diagram describing an exemplary method of creating photonic quantum states from free electrons by modulation in the space-momentum domain;

FIGS. 5A-5E exemplify the use of the technique of the disclosure for generation of cat states and GKP states by interaction between free electrons with an optical mode, wherein FIG. 5A shows the preparation scheme where a monoenergetic electron is shaped into a comb with energy spacing of $N \cdot \hbar\omega$, exemplified for $N=2$; FIG. 5B shows the light emission stage: the electron interacts with a photonic structure, emitting photons into an optical mode; FIG. 5C shows the post-selection stage: the electron is measured, heralding the generated photonic state; and FIGS. 5D and 5E show examples of Wigner functions for the resulting photonic states in the cavity mode: a cat state can be generated using an electron comb and a post-selection of its energy and a GKP state can be generated using multiple comb electrons with a specific sequence of post-selection;

FIGS. 7A-7H exemplify a scheme for generation of N-component cat states emitted from free electron; wherein FIG. 7A shows the energy spectrum of a comb w electron, with $N \cdot \hbar\omega$ spacing shown for $N=1$ and FIG. 7B shows that when this electron emits photons of energy $\hbar\omega$ the Wilmer function of the photon takes the form of a coherent state; FIG. 7C shows the energy spectrum of a comb electron with an energy spacing of $2\hbar\omega$ post-selected for even/odd energies after emitting photons of $\hbar\omega$, and FIG. 7D shows that in this case the photonic Wigner function takes the form of even/odd cat states; FIG. 7E shows a comb electron with an energy spacing of $4\hbar\omega$ post-selected after emitting photons of $\hbar\omega$ and FIG. 7F shows that in this case the photonic Wiper function takes the form of the different four-components cat states;

FIG. 7G shows energy spectra of Gaussian electron combs (energy spacing of $2\hbar\omega$) with a standard deviation of $\sigma=4$ (red) and $\sigma=8$ (black) in units of photon energy ($g_Q = \sqrt{\pi/2}$); and FIG. 7H shows the fidelity of the post-selected even cat states after interaction with the Gaussian comb electron;

FIGS. 8A-8E exemplify a scheme for optical GKP states generation starting from squeezed vacuum optical state, where FIG. 8A shows the evolution of the photonic Wigner function after each electron interaction and post-selection. The first interactions all have the same coupling constant $g_{Q1}=i\sqrt{\pi/8}$, together squeezing the vacuum state. The phase of the interaction is then shifted by $\pi/2$, so the later interactions all have a coupling constant $g_{Q2}\sqrt{\pi/2}$, transforming the squeezed-vacuum state into a GKP state. FIG. 8B shows creation of GKP state directly from an initial squeezed vacuum excitation, i.e., "seeding" the electron-photon interaction with a squeezed vacuum in the optical mode. The GKP state is alternating between the approximated $$|0\rangle_{ph}^{GKP} \text{ and } |1\rangle_{ph}^{GKP},$$

showing that each interaction resembles the X gate for the GKP states. FIG. 8C shows that the coefficients of the photonic state at every step of the process are described analytically using a Pascal triangle; FIG. 8D and FIG. 8E show, respectively, the squeezing parameter and post-selection probability to achieve the final GKP state as a function of a number of electron interactions: comparing photonic initial conditions of vacuum (FIG. 8A) and squeezed vacuum (FIG. 8B);

FIGS. 9A-9E show schemes for creation of different GKP states and their characterization, wherein FIG. 9A shows creation of the magic GKP state $$|H\rangle_{ph}^{GKP}$$

($3^{rd}$ row in Table 1); FIG. 9B shows creation of the hexagonal GKP state $|0\rangle_L$ ($6^{th}$ row in Table 1); FIG. 9C shows creation of the hexagonal GKP state $|0\rangle_L$ ($6^{th}$ row in Table 1); FIGS. 9D and 9E show, respectively, the squeezing parameter and post-selection probability of the GKP states in (FIGS. 9A, 9B, and 9C) as a function of the number of electrons;

FIGS. 10A-10C exemplify a protocol for conditional displacement using spatial electron-wavefunction modulation; wherein FIG. 10A shows the free electron wavefunction split to two, for example, using a bi-prism. Then only one of the trajectories interact with a cavity with coupling constant g such that $g_{right}=0$, $g_{right}=g$; FIG. 10B shows an alternative scheme in which a cavity with anti-symmetric mode is employed. In this case the two electron paths are focused into different parts of the cavity such that $g_{right}=g$, $g_{right}=-g$; and FIG. 10C shows the two electron paths sent to an electron beam-splitter, after the interaction, which mixes the paths and sends the output into two spatially separated electron counting detectors;

FIGS. 11A-11C exemplify the free-electron-photon interaction as a fundamental building block for quantum information processing, wherein FIG. 11A shows the free electron pre-shaped into a free-electron qubit state, which interacts with the photonic mode through a near-field coupling (the photonic mode contains a GKP state; the interaction entangles the electron with the GKP state); FIG. 11B shows the free-electron qubit states by their energy spectra, as the even (dotted, qubit $|0\rangle_e$) and odd (solid, qubit $|1\rangle_e$) comb electrons with $2\hbar\omega$ energy spacing; and FIG. 11C shows building blocks for universal quantum computation on the free-electron qubit and a GKP state (left) and their corresponding circuits (right). where the first is the interaction scattering matrix, the second is the free space propagation (FSP) operation on the electron, and the last is the PINEM operation on the electron which describes interaction with classical coherent light;

FIGS. 12A-12C exemplify single-qubit gates induced by the free-electron ancilla, wherein FIG. 12A shows readout operation: using electron ancilla qubit with interaction $$g_Q = \frac{a_z}{4},$$

followed by a measurement of the electron to extract the GKP state; FIG. 12B shows the T gate: using electron ancilla with interaction $$g_Q = \frac{a_z}{4}$$

Figure 13A:
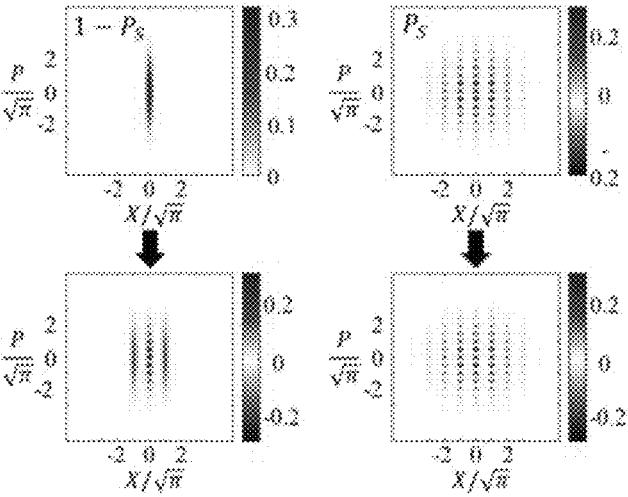
Figure 13B:
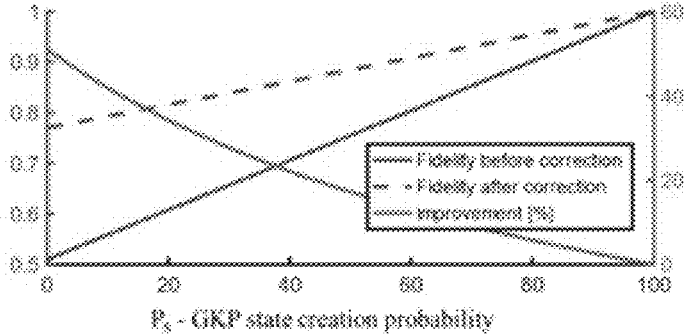
Figures 14A, 14B, 14C:
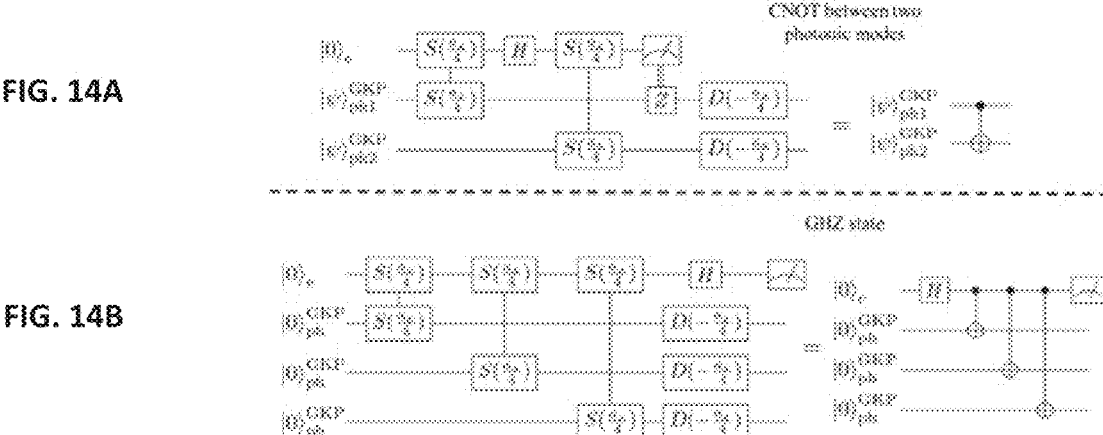
Figure 15A:
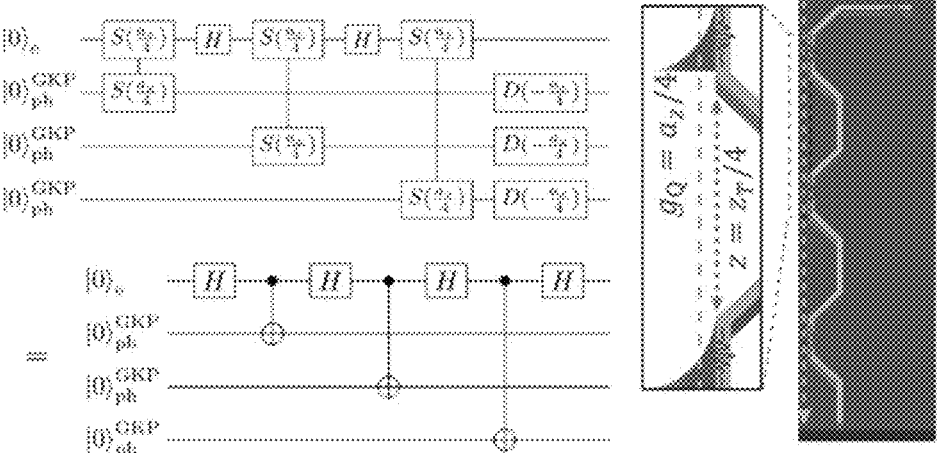
Figure 15B:
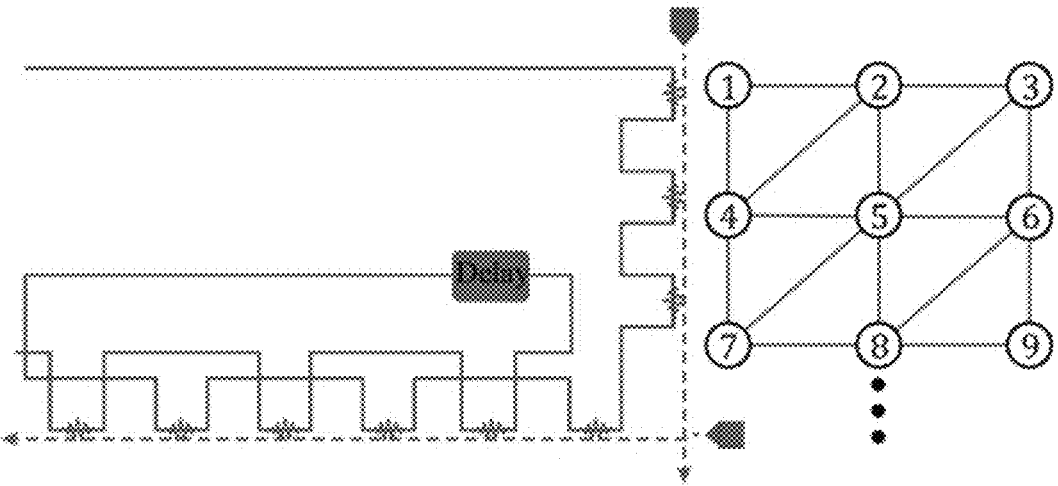

performing a controlled-phase gate on the GKP state, with the electron being the control qubit. Then the electron is measured in the basis $$|\pi/4_\pm\rangle = \frac{1}{\sqrt{2}}\left(e^{\frac{i\pi}{8}}|0\rangle_e \pm e^{-\frac{i\pi}{8}}|1\rangle_e\right),$$

using the unitary $$U\left(\frac{\pi}{4}\right),$$

where the double line denotes classical feedforward, i.e., if the measurement result is $|\pi/4_-\rangle$, the Pauli $\sigma_z$ gate is applied; and FIG. 12C shows rotation gate $R_i(\phi)$ in the i=x, y, z direction: using tree-electron ancilla with $$g_Q = \frac{a_i}{2}$$

performs the gate controlled-Pauli ($C\sigma_i$) on the GKP state, with the electron being the control qubit and then the electron is measured in the basis $$|\phi_\pm\rangle = \frac{1}{\sqrt{2}}\left(e^{\frac{i\phi}{2}}|0\rangle_e \pm e^{-\frac{i\phi}{2}}|1\rangle_e\right),$$

using the unitary $U(\phi)$ (For feedforward, if the measurement result is $|\phi_-\rangle$, the Pauli $\sigma_i$ gate is applied);

FIGS. 13A and 13B exemplify free-electron-based correction protocol to improve the fidelity of a GKP generation scheme, wherein FIG. 13A shows the electrons interacting with a squeezed vacuum state (left) and a GKP state (right); and FIG. 13B shows fidelity (relative to a GKP state) as a function of $P_s$, $P_s$ being the probability of generating a GKP state, and $1-P_s$ being the probability of generating squeezed vacuum state (The fidelity is shown without free-electron-based correction protocol (dashed line) and with (solid line), showing a deterministic increase in fidelity of close to 50%);

FIGS. 14A-14C exemplify creation of multiqubit entanglement using free electrons, wherein FIG. 14A shows $CNOT_{ph1 \to ph2}$ gate between two GKP states, FIG. 14B shows the scheme for generating a GHZ state of three GKP states, and FIG. 14C shows two approaches for implementing the GHZ state: stationary GKP states in cavities (left) and propagating GKP states in a waveguide (right); and FIGS. 15A and 15B exemplify the use of flying qubits for the generation of cluster states, wherein FIG. 15A shows a scheme for generating a 1D cluster state of GKP states in a photonic waveguide, and FIG. 15B shows generation of 21) cluster states of GKP states.

DETAILED DESCRIPTION OF EMBODIMENTS

Figure 1:
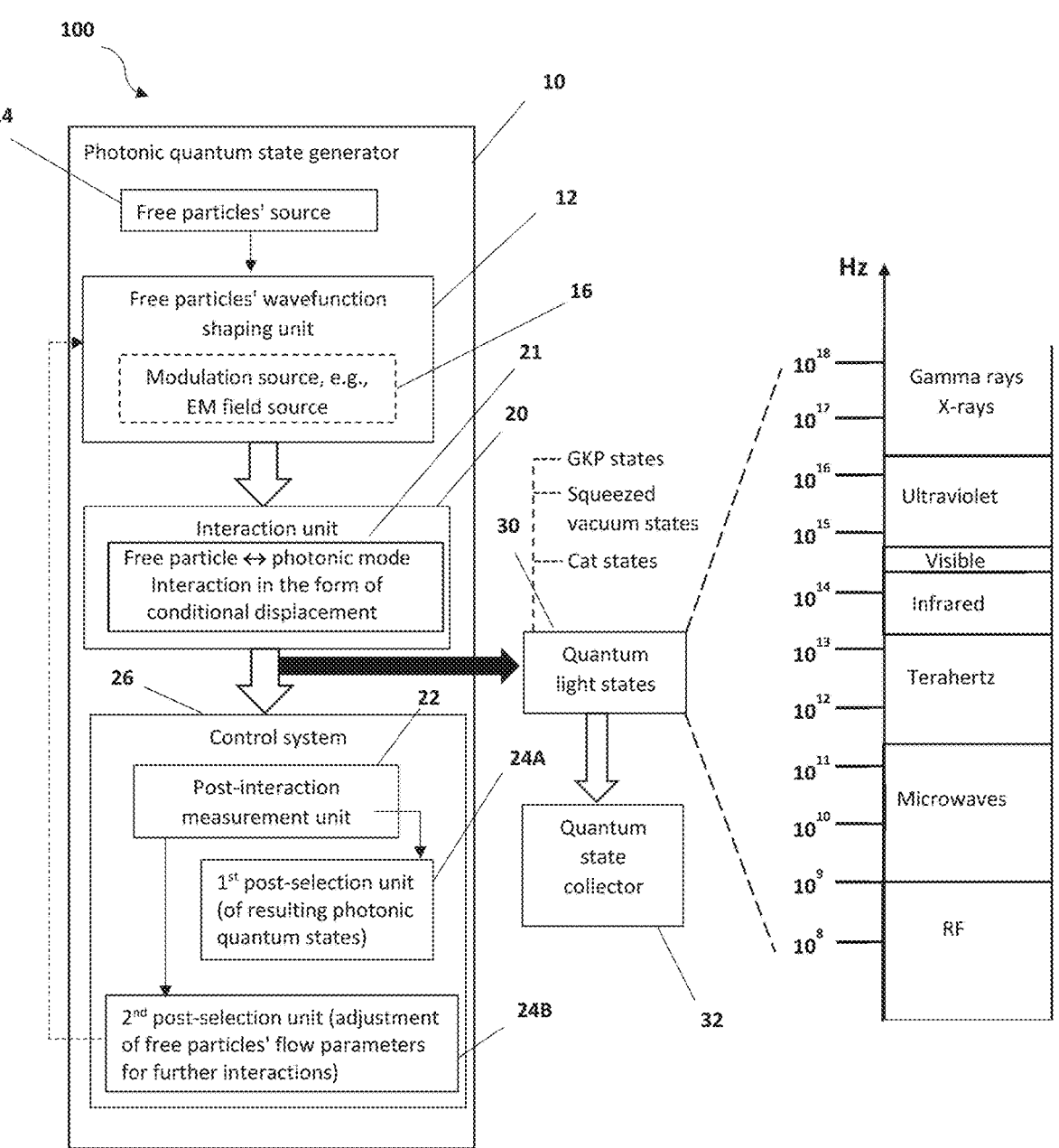
FIG. 1 is a schematic illustration of the configuration of a system of the present invention for generating quantum photonic states.

Reference is made to FIG. 1 schematically illustrating a system 100 of the present disclosure configured and operable to produce various photonic quantum states. The system 100 includes a photonic quantum state generator 10 capable of generating one or more predetermined photonic quantum states, generally denoted 30, in a range from radiofrequency to X-ray.

The photonic quantum states 30 include one or more of the following: squeezed vacuum states, cat states, and Gottesman-Kitaev-Preskill (GKP) states. The creation of such photonic quantum states relies on strong interactions between free particles, e.g., electrons, with light.

The photonic quantum state generator 10 includes, inter cilia, a free particles' source 14 providing a flow of free particles with predetermined one or more flow parameters/conditions, a shaping unit 12 configured to shape free particles' wavefunction, an interaction unit 20. The shaping unit 12 is located in a vicinity of a flow of the free particles and configured and operable to apply said wavefunction shaping to provide coherently shaped free particles in either one of time-energy domain or space-momentum domain. The interaction unit 20 includes a photonic structure 21 and defines an interaction region enabling m interactions ($m \geq 1$) between a photonic mode (defined by the photonic structure 21) and the flow of the coherently shaped free particles having said one or more flow parameters satisfying a phase-matching condition with respect to the photonic mode. By this, one or more predetermined photonic quantum states can be generated by a conditional displacement mechanism.

The conditional displacement mechanism is actually an operator (function) describing an effect of a change in the parameters/conditions (controllable at the particle's shaping stage) of the free particles (e.g. electrons) on the light state resulting from the interaction between such free particles and a photonic mode. Such parameters/conditions may include one or more of the following: a frequency spacing between the energy combs of free particles or time spacing between the particles' pulses in a pulse train, which may for example be achieved via modulation of electromagnetic field source if used as part of the shaping unit.

Also, it should be noted that the phase-matching condition, i.e. a condition that the phase velocity of light equals the electron velocity, can be obtained by any suitable technique, for example by adjusting a particle beam diameter together with a particle's flow convergence angle (to provide relatively small for both of them).

The photonic quantum state generator 10 is associated with a control system 26 which is configured and operable to perform a post-selection procedure. As will be described below, the control system 26 includes: a post-interaction measurement unit 22 which performs a number resolving post-interacting measurement of the free particles emerging from the interaction region, and generates measured data indicative of at least one parameter of the free particles after the interaction. The control system 22 further includes at least one of post selection units 24A and 24B (software analyzers) which analyze the measured data and initiate feedback-based or feedforward-based post-selection of, respectively, the photonic state being generated and operational parameters of the shaping unit. The conditional displacement mechanism/operator created by the free particle-photon mode interaction, provides readout of the quantum information encoded in the light state being generated (e.g., GKP state) in the photonic mode, from the post interaction particle measurement.

The free particles may be electrons, ions, atoms, photons, molecules. In the present description the technique of the present disclosure is exemplified in relation to free electrons. Since electrons can interact resonantly with light across the electromagnetic spectrum, the approach of the present disclosure may be used for the generation of cat and GKP states over the entire electromagnetic spectrum, from radio-waves to X-rays.

The so-produced quantum photonic states can be appropriately collected using any known suitable quantum state collector arrangement 32.

The free particles' source 14 may provide e.g., a monoenergetic electron flow, with the electron having a predetermined kinetic energy. The free-electron wavefunction of this monoenergetic electron may be shaped in time domain, i.e., undergo a temporal modulation by the shaping unit 12.

As shown in the figure in dashed lines, in some embodiments, such temporal modulation may be implemented using EM radiation from an EM field source 16. Such temporal modulation may be induced by interaction with light e.g., as in photo-induced near-field electron microscopy (PINEM) known to be realized in transmission and scanning electron microscopes.

In the present disclosure the electrons are shaped as energy combs with a periodicity of multiple photon energy $N \cdot \hbar \omega$ and equal phases.

The electrons shaped into energy combs enter the interaction region of the interaction unit 20 where they interact with a photonic mode. The interaction unit 20 enables m interactions ($m \geq 1$) between a photonic mode and the flow of electrons shaped into energy combs, emitting photons into the photonic mode.

The preferred photonic structures are ones designed to guide light in a photonic cavity (waveguide, cavity, photonic nanostructure) that supports a phase-matched interaction with the electron, i.e., such that the phase velocity of light equals the electron velocity. Satisfying such a phase-matching condition of the electron flow with respect to the photonic mode provides a strong interaction of free electrons with light, generating thus one or more predetermined photonic quantum states by a conditional displacement mechanism as will be described in detail below.

As described above, the generator 10 is associated with the control system 26 which includes the post-interaction measurement unit 22 which measures the energy of the electron heralding the generated photonic state, and the first post-selection unit 24A and/or second post-selection unit 24B.

In some embodiments, the measurement unit 22 may include a spectrometer configured and operable to perform number and energy resolving post-interacting measurement providing the measured data indicative of an energy change of the free particle after the interaction with the photonic mode, thereby controlling the photonic quantum states being generated. In other embodiments, the measurement unit 22 may include an electron counting camera providing the measured data indicative of the spatial trajectory change of the electrons after the interaction. In this case, the post-selection may be achieved in the momentum space, for example via diffraction.

Reference is made to FIG. 2 exemplifying by way of a flow diagram a method 200 of the present disclosure for creating optical cat, squeezed vacuum and GKP states using free electrons. The process of creating non-Gaussian quantum states starts with the generation of shaped electrons (202). This can be realized by shaping the free electrons' wavefunction in time into a coherently shaped pulse train in the form of a frequency/energy comb with an energy spacing of $N \cdot \hbar\omega$, N being an integer, between neighboring peaks. Such time-energy shaping of a free electron wavefunction is feasible and was demonstrated by ultrafast transmission electron microscopy (UTEM).

In the next step, the shaped free electrons are directed to interact with a photonic mode of frequency $\omega$ (e.g., in a photonic waveguide), while satisfying phase-matching condition with respect to said photonic mode (204). It should be noted that, although photons and electrons interact extremely weakly in free space due to the lack of energy-momentum matching, light field component (e.g. evanescent field components) produced upon light scattering by material structures breaks the mismatch, giving rise to efficient light-electron interaction, and effective exchanges of multiple quanta between the electron and the photonic mode.

It should be noted that the expression "satisfying a phase-matching condition with respect to the photonic mode" as used herein means that the group velocity of the electron wavefunction along the electron trajectory is substantially/almost matching the phase velocity of the light wave within the photonic structure. This phase matching allows a resonant exchange of photon quanta between the photonic structure and the electron. Efficient light emission requires also strong coupling between the electron and the photonic mode which can be attained, e.g., for electron interaction with micro-cavities or with photon crystal flat-bands. It will be described below that the interaction strength can be further increased using a longer phase-matched interaction and a highly confined photonic mode.

In the last stage (e.g., 206, 210, 216 and/or 220), which is the post-selection stage, the electron's parameter(s) is/are measured, heralding the generated photonic state.

If post-selection is performed on electron energy of $2 \cdot \hbar\omega$ (206), the radiation takes the form of N-legged Schrodinger cat state (208) where the post selected energy dictates the state's parity, if m electrons are post-selected with even electron energies of $E_0 + 2n \cdot \hbar\omega$ (210), the radiation takes the form of squeezed vacuum light state (212).

Since electrons are easy to detect efficiently and their energy spectrum is readily measured in electron microscopes, this also provides feed-forward abilities (i.e., adjustment of electron flow shaping parameters/conditions), and thus the creation of the photonic quantum states by the techniques of the present disclosure can be improved to be completely deterministic.

A GKP state can be generated using multiple comb electrons with a specific sequence of post selections. For example, a squeezed vacuum light state may be created, e.g., through 4m interactions with even comb electrons (214). If even energies are post-selected when m is even (216), the radiation takes the form of GKP state corresponding to logical qubit $|0\rangle_L$ (218), whereas if even energies are post-selected when m is odd (220), the radiation takes the form of GKP state corresponding to logical qubit $|1\rangle_L$ (222). Different protocols for the creation of grid coherent states using electron combs will be detailed further below.

Reference is made to FIG. 3 exemplifying by way of a flow diagram 300 a method of the present disclosure for creating photonic quantum states in lower frequencies, such as THz, microwave, and radio frequencies. At these lower frequencies appropriate energy modulations of the electrons might not be accessible, and the procedure of the above-described method (200 in FIG. 2) might not be applicable. Thus, it is required to shape the free electrons' wavefunction in space, e.g., into first and second (left and right) coherent spatially separated beams, e.g., by using a beam-splitter like an electron bi-prism or an electron phase-plate (302).

In the next step (304) the electrons interact with a photonic mode (e.g., in a microwave cavity) with frequency $\omega$ such that $\hbar\omega$ is significantly smaller than the electron energy width. The inventors realized that the interaction strength between the electron and the photonic mode changes in size on scales comparable to the radiation wavelength, which is ranging from a few microns to a few centimeters in the case of the lower frequencies. Therefore, by spatially splitting the electron flow, one can cause the two electron paths to interact differently with the photonic mode (e.g., only one path interacts with the mode or both interact with the mode in an antisymmetric manner).

The two electron paths are then directed into another electron beam splitter/combiner which combines the paths and thus mixes the electron flows (306). The output of the beam splitter/combiner is collected by a differential detector (measurement unit), i.e., two spatially separated electron counting detectors (308), which heralds the creation of photonic states. The emitted radiation being collected by a radiation detector is in a form of the desired quantum states (310).

The detectors may be fast electron cameras. The availability of fast electron cameras allows also for feed-forward mode (adjustment of the shaping unit operation) for creation of the required quantum states also at these low frequencies.

Figure 4:
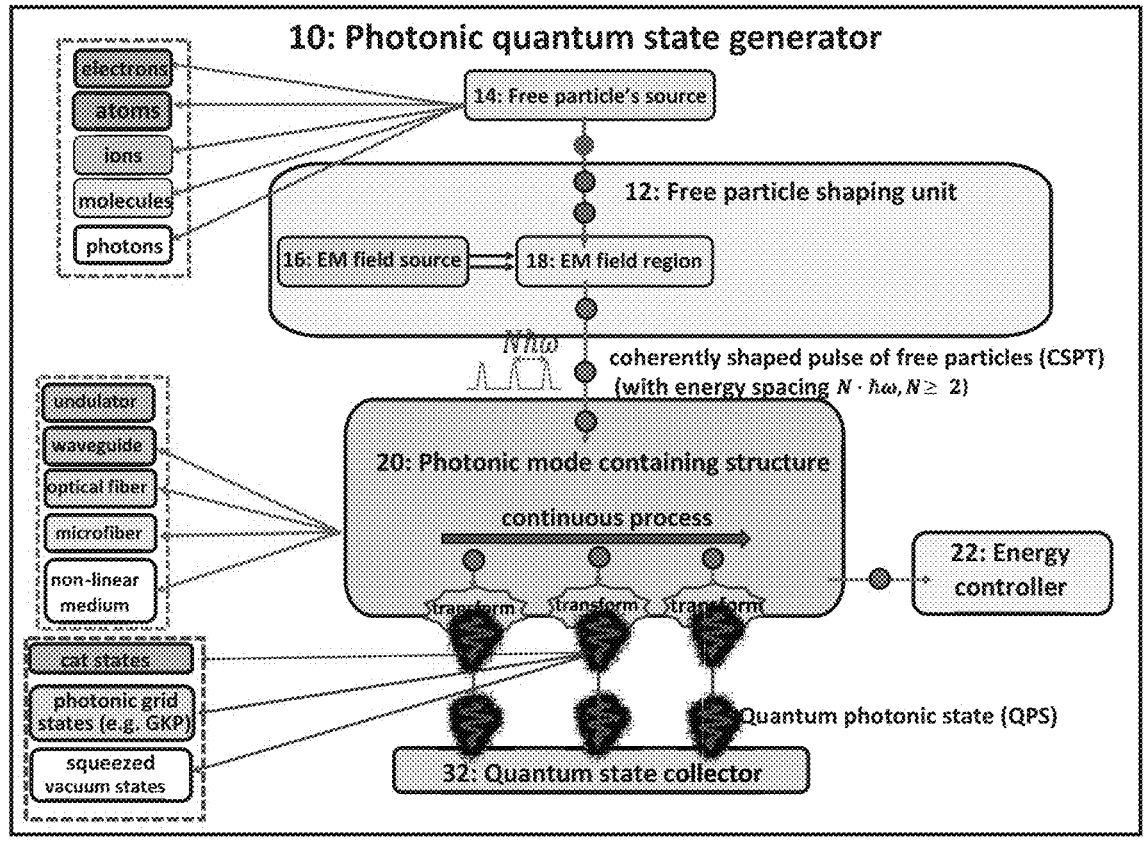
FIG. 4 is a schematic illustration of the configuration of a system of the present invention for generating quantum photonic states.

Referring to FIG. 4, there is schematically illustrated an exemplary configuration and operation of a photonic quantum state generator 10 of the present disclosure. To facilitate understanding, the same reference numbers are used to identify components that are common in all the examples.

The generator 10 is capable of generating one or more predetermined photonic quantum states in a range from radiofrequency to X-ray. This is achieved by m interactions ($m \geq 1$) between free particles and a photonic mode (at times referred to herein below as "optical mode") within a photonic structure, where the free particles' parameters and the photonic mode are configured to satisfy a phase-matching condition as described above. The free particles interacting with said photonic mode are in the form of a coherently shaped pulse train.

The photonic quantum state generator 10 includes a free particles' source 14, a free particles' wavefunction shaping unit 12, a photonic mode containing medium/structure 20 defining an interaction region/zone/medium. Such structure 20 may be in the form of a waveguide, optical fiber, microfiber, non-linear medium, etc. Generally, the photonic mode containing structure 20 may or may not be a resonating structure; resonating structure may or may not include a non-linear medium; as well as may be configured as an optomechanical system or electro-optical system. A non-limiting example of configuration and operation of such structure will be described further below with reference to FIGS. 6A to 6C.

Also preferably provided in the generator 10 is a control system including a measurement unit (energy controller) 22 for controlling/measuring the electron energy after the interaction, and a post-selector unit (not shown here) which analyzes the measure data and operates e.g. in feedback mode to select the corresponding photonic quantum state resulting from the interaction. As described above, the measurement unit may be of any known suitable type, e.g. including a spectrometer providing measured data indicative of an energy change of the free particle after the interaction with the photonic mode.

In the non-limiting example of FIG. 4, the particles' energy shaping unit 12 is also associated with a source of electromagnetic field 16 (e.g. laser). The particles' energy shaping unit 12 is configured and operable to shape the particles' (e.g. free electrons) wavefunction in either one of space-momentum domain or time-energy domain. For example, depending on the desired frequency range (e.g. shape light in any range from the IR to higher frequencies (optical, UV, X-ray)), the electrons need to be shaped in time, such that their wavefunction takes the form of energy combs, i.e., the enemy spectrum of the electron pulse is a series of peaks with equal energy spacing between neighboring peaks.

Thus, the particles' energy shaping unit 12 operates to controllably adjust a frequency of the electromagnetic field, $F_{EM}$, to be in a predetermined relation with a frequency $F_{RS}$ of the photonic mode defined by the structure 20, i.e. to satisfy the condition: $F_{EM}=N \cdot F_{RS}$, N being an integer $N \geq 2$.

The above provides that the electromagnetic field generated by the field source 16 affects the free particles while passing through the field region 18, to produce a coherently shaped pulse train CSPT of free particles having an energy spectrum in the form of a series of peaks (frequency comb) with equal energy spacing $N \cdot \hbar \omega$ between neighboring peaks, $\omega$ being a frequency of the photonic mode defined by the structure 20 and N being an integer $N \geq 2$. Such a coherently shaped pulse train, while interacting with the photonic mode, generates radiation in the form of a superposition of N coherent quantum photonic states QPS of different phases (e.g. opposite phases).

It should be understood, although not specifically shown, that in some cases (e.g. in case of stationary particles, such as atoms or molecules), the same structure (e.g. waveguide) can be used which incorporates the functions of free particles' source, the particles' energy shaping unit (e.g. by being exposed to properly controlled laser pulses), and the photonic mode containing interaction medium.

The system may be configured to produce various photonic states, including cat states, photonic grid states (e.g. GPK states), squeezed vacuum states. The so-produced quantum photonic states can be appropriately collected using any known suitable collector arrangement 32. The structures into which the created quantum radiation is emitted can be one of many types of technologies, as used in CQED (Circuit Quantum Electro-Dynamics), continuous variable quantum elements such as transmons and other Josephson junction-based devices, traveling wave tubes, orbitrons, superconducting elements, conventional waveguides in RF and microwave. Note that in these cases cooling is required to maintain the quantum state.

Reference is made to FIGS. 5A-5E exemplifying the use of the system of the disclosure for the generation of cat states and GKP states by the interaction between free electrons with the photonic mode.

The technique of the present disclosure for creating desired non-Gaussian quantum states may thus include three functional stages: (a) generation of shaped electrons (i.e., comb electrons) (FIG. 5A), (b) efficient free-electron-photon interaction (in the strong coupling regime) (FIG. 5B), and (c) electron energy post-selection (FIG. 5C). The inventors used an assumption of a highly paraxial electron with energy much higher than that of the photon with which it interacts, yet energy uncertainty smaller than the photon energy. This condition is frequently realized in transmission and scanning electron microscopes, as exemplified by different experiments in photon-induced near-field electron microscopy (PINEM), and explained theoretically.

Using a quantum-optical framework, the interaction between a free electron and an optical mode is captured by the scattering matrix:

$$s = \exp[g_Q b a^\dagger - g_Q^* b^\dagger a], \tag{1}$$

where a, $a^\dagger$ are the annihilation and creation operators for the photonic mode; b, $b^\dagger$ (satisfying $bbt^\dagger = b^\dagger b = 1$) are operators describing an electron translation in energy, which correspond to the emission or absorption of a single photon. A general electron wavefunction is described as a superposition of monoenergetic states $\oplus n \rangle_e = |E_0 + n \hbar \omega \rangle_e$, each describing an electron shifted by a multiple of the photon energy $n \hbar \omega$. The condition to consider the electron as occupying such a discrete ladder of energy states is that the electron interacts predominantly with a single optical mode of frequency $\omega$. In conventional PINEM experiments that probe stimulated interactions, this condition is ensured by the pump laser linewidth, which creates a narrow-bandwidth excitation. In the spontaneous (non-pumped) case considered in the present disclosure, the condition to consider the electron as on a discrete ladder is that it predominantly emits into a single optical mode. Using this notation, the electron translation operators satisfy $b^\dagger |n\rangle_e = |n+1\rangle_e$, $b|n\rangle_e = |n-1\rangle_e$.

The state $|0\rangle_e$ can be used as the initial electron state before it is shaped into a comb.

The coupling constant $g_Q$ is a dimensionless complex parameter that describes the interaction strength and the phase between the optical mode and the free electron, $g_Q$ is defined using the electric field E of the optical mode, normalized to the amplitude of a single photon, with v being the electron velocity and $r_\perp$ being its transverse location:

$$g_Q = \left( (q_e/\hbar \omega) \int E_z(r_\perp, z) e^{-i\omega z/v} dz. \right. \tag{27}$$

Equivalently, $g_Q$ can also be derived from the Green's function of the optical structure:

$$|g_Q|^2 = (q_e^2 \mu_0/\pi \hbar) \int \mathrm{Im} G_{zz}(r_\perp, z; r_\perp, z'; \omega) e^{-i\omega(z-z')/v} dz dz'.$$

The free-electron wavefunction can be shaped in the time domain, i.e., undergo a temporal modulation induced by the interaction as in PINEM [40] or the pondermotive interaction [28,29].

Let us consider electrons shaped as energy combs with a periodicity of multiple photon energy $N \cdot \hbar\omega$ and equal phases. Such an ideal electron comb can be approximated by shaping a monoenergetic electron using multiple frequencies [30] or multiple interaction stages [31]. In the following, it is shown that these combs can be used for heralding different cat states, under certain energy post-selection conditions.

As described above, the first step in creating quantum light states is shaping the electrons in energy combs, i.e., providing that the energy spectrum of the free electron is in the form of coherently shaped pulse train: a series of peaks with substantially equal energy spacing between neighboring peaks, preferably also substantially equal amplitude of the peaks and of approximately linear phase relation. In the example of FIG. 5A a monoenergetic electron is shaped into a comb with energy spacing of $N \cdot \hbar\omega$ with N=2 after interacting with a few femtoseconds' laser pulses. Generally, the electrons can be coherently shaped into different types of combs with $N \cdot \hbar\omega$ spacing for different values of N.

Preferably, a specific structure such as nanophotonic silicon inversed-designed structure or DLA (Dielectric Laser Acceleration) structure can be used in the particles' shaping unit that can be efficiently designed to provide the interaction between the free electrons and a femtosecond laser, coherently shaping electrons in the required comb pulses. For example, in order to generate light in lower frequencies, such as THz, microwave, and radio frequencies, the free electrons are shaped in space, into two or more spatially separated beams. To this end, electron beam splitters including any one of electron bi-prism, or electron phase-plate can be used.

Generally, however, several other approaches can be proposed to create the shaped electron combs, e.g., using the known-in-art of PINEM technique, using light-field-driven tunneling or other schemes of electron emission from tips.

In the light emission stage (FIG. 5B), the electron interacts with a photonic structure, emitting photons into an optical mode. The preferred structures are ones designed to guide light in a waveguide/cavity that support a phase-matched interaction with the electron for a stronger coupling constant (higher $g_Q$).

In the post-selection stage (FIG. 5C) the electron is measured, heralding the generated photonic state. In the case exemplified here, if the measured energy is even (k=0), an even cat state is created: $|\alpha\rangle + |-\alpha\rangle$. If the measured energy is odd (k=1), an odd cat state is created: $|\alpha\rangle - |-\alpha\rangle$.

FIGS. 5D and 5E show examples of Wigner functions for the photonic states that can be generated via the scheme of the present disclosure. A cat state can be generated using an electron comb and a post-selection of its energy (FIG. 5D) with $g_Q$=4. A GKP state can be generated using multiple comb electrons with a specific sequence of post-selections as described in Table 1 with $g_Q = \sqrt{\pi/2}$.

It has already been noted above that the technique of the present invention to create quantum light is not limited to optical frequencies and can be implemented for radiation into radiofrequency, microwave and THz. In this range of frequencies, the free particle would need to have higher energy resolution, and special means to prepare the initial monochromatic particle might be necessary. Considering electrons, the photon energy at these range of frequencies is smaller than the free electron energy spread, therefore a different technique will be described below, consisting of space-modulation rather than energy-modulation.

Shaping the electrons in energy combs in the microwave, THz, X-ray, and gamma-rays may be accomplished using an undulator with higher energy and higher current charged-particle beams, for example, inside a free-electron laser. In this scheme, the electron is modulated using an undulator of periodicity two times smaller in space relative to the undulator that will later be used for radiation emission. The first undulator operates as a beam shaping unit which creates the electron comb, and then the second (successive) undulator operates as an interaction unit (including one or more photonic structures) which enables electron-photonic mode interaction and thus radiation of lower (halt) photon energy. In the end, the electrons can be post-selected in order to filter out the photon energies corresponding to the radiation in the frequency used for shaping.

There are several types of structures and interactions that can replace the first or second undulator, such as a Compton-type interaction in free space. This concept can be implemented in a free-electron laser (FEL). There, the pre-bunching and self-bunching can help shape the electrons to the necessary comb of energies. For higher energy photons, one can do with lower energy resolution in the spectrometer, making the technical implementation simpler in that respect.

In the interaction stage, the free electron interacts with a photonic mode, e.g. a photonic waveguide, emitting light into it. Efficient interaction between the photonic mode and free electrons can be provided by proper design of the respective structure (e.g. a photonic cavity or a photonic waveguide) while satisfying phase-matching conditions. Phase matching here means that the phase velocity of light equals the electron velocity. The inventors have found that the conditions providing stronger interaction between the photonic mode and the free electrons include (and are not limited to): confined mode, long interaction (higher than ten wavelengths of the electromagnetic field source) with the free particle, good overlap between the particle's trajectory and the electromagnetic field mode, field polarization mostly parallel to the particle's trajectory.

Optical waveguides suitable for the implementation of the photonic mode containing structure are very versatile and can be made from different types of materials, e.g., semi-conductors, insulators, metals, polymers, etc. The photonic mode can be implemented by any type of the following waveguides: optical fibers, rib/slot waveguides, photonic waveguides, plasmonic waveguides, whispering gallery mode structures, silicon photonic waveguides, or high-Q microcavity.

Figures 6A, 6B, 6C:
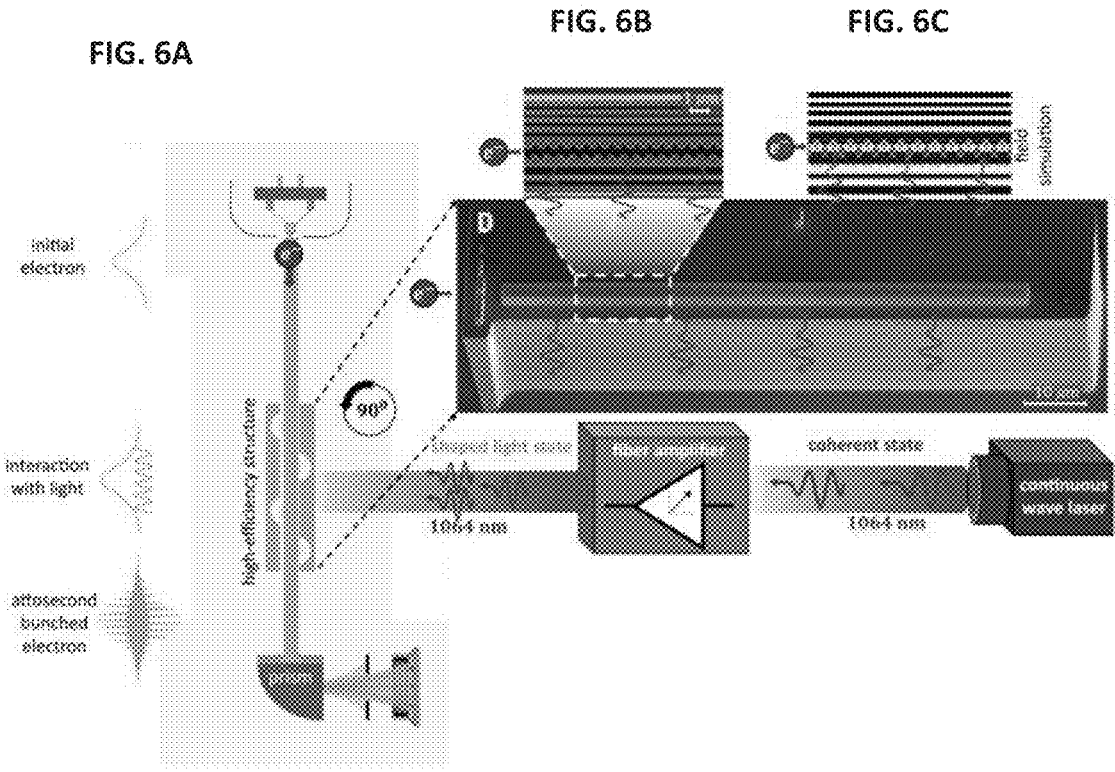
FIGS. 6A-6C exemplify a silicon-photonic nanostructure suitable to be used in the present disclosure for interaction between the comb electrons and the optical mode defined by said structure.

An example of the configuration and operation of the possible photonic structure, known in the art, is shown in FIGS. 6A-6C, FIG. 6D shows a custom-made silicon-photonic nanostructure. Thus nanostructure can provide quasi-phase-matched efficient free-electron-quantum-light interaction inside a transmission electron microscope (TEM) as shown in FIG. 6A, FIG. 6Bb shows a scanning electron microscope image of the coupling structure. Light and electrons are efficiently coupled by using a resonating quasi-phase-matched structure consisting of a periodic channel and a Bragg mirror. FIG. 6C shows the simulation of the longitudinal quasi-phase-matched electric field in the nano-structure, optimized with photonic inverse design methods for efficient free-electron-light interaction. Photonic inverse design methods can be used to design and optimize this high-efficiency electron-light coupler operating at a wave-length of 1064 nm and electron kinetic energy of 189 keV.

It should be noted, and also described above, that the structure containing the photonic mode does not necessarily have to be a waveguide or a cavity. The interaction can be implemented, for example, inside an electron microscope. Other charged particles, e.g., ion beams, electron beams can be used.

Figure 7A:
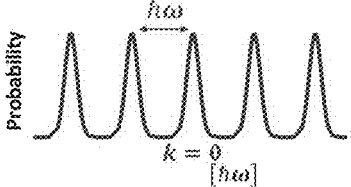

Reference is made to FIGS. 7A to 7H describing the characterization of multi-component (N-component) cat states (also known as multi-legged cat states) emitted from a free electron. Such N-component cat state can be described as $$|cat_N^k\rangle_{ph} \propto \Sigma_{m=0}^{N-1}\exp(-2\pi ikm/N)|\exp(2\pi im/N)\alpha\rangle_{ph},$$

where $|\alpha\rangle_{ph}$ describes a coherent state. To create the N-component cat state, the inventors prepare a comb electron $$|comb_N^0\rangle_e \propto \sum_{n=-\infty}^{\infty} |E_0 + n\cdot N\cdot\hbar\omega\rangle_e$$

with an energy spacing of $N\cdot\hbar\omega$ (FIG. 7A). They further define the shifted combs to be $$|comb_N^m\rangle_e = b^{\dagger m}|comb_N^0\rangle_e,$$

noting that any $$|comb_N^m\rangle_e$$

is invariant under $b^N$. Assuming an initially empty optical mode (vacuum state $|0\rangle_{ph}$), the joint state of the photonic state and a comb electron is $$|\Psi_{in}\rangle = |comb_N^0\rangle_e \otimes |0\rangle_{ph}.$$

The interaction is described by the scattering matrix S from Eq. (1) that acts on the joint state and creates:

$$|\Psi_{out}\rangle = S|\Psi_{in}\rangle = \frac{1}{N}\sum_{k=0}^{N-1} c_N^k|cat_N^k\rangle_{ph} \otimes |comb_N^{-k}\rangle_e, \quad (2)$$

where $$|cat_N^k\rangle_{ph} = \frac{1}{c_N^k}\sum_{m=0}^{N-1}e^{-i2\pi mk/N}|g_Q e^{2im\pi/N}\rangle_{ph}$$

is the $k^{th}$ order of the N-component cat state and $$c_N^k$$

is a normalization factor that captures the probability of post-selecting the $k^{th}$ cat.

After the interaction, the inventors post-select the electron energy to have a certain value $k\cdot\hbar\omega$ (modulo $N\cdot\hbar\omega$), which heralds the emission of a cat state $$|cat_N^k\rangle_{ph}$$

Figure 7B:
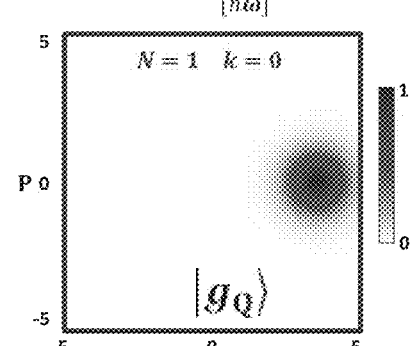
Figure 7C:
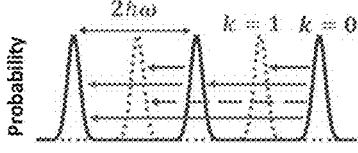
Figure 7D:
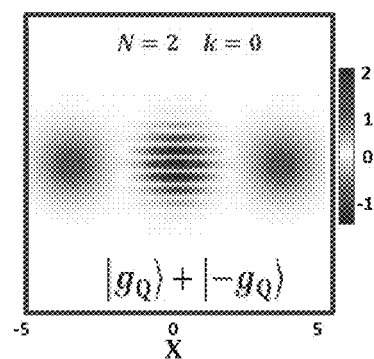

(FIGS. 7A to 7F). FIGS. 7A and 7B show that when a comb electron with an energy spacing of $\hbar\omega$ emits photons of energy $\hbar\omega$, the Wigner function of the photon takes the form of a coherent state. FIGS. 7C and 7D describe the case of N=2 (i.e., energy spacing $2\hbar\omega$) and post-selection of even/odd electron energies (k=0/1), where the electron radiation takes the form of the even/odd Schrodinger cat state), i.e., a superposition of two coherent states with opposite signs ($|g_Q\rangle_{ph}$ and $|-g_Q\rangle_{ph}$). This process of post-selecting even or odd cat states exemplifies a conditional displacement mechanism applied to the photonic mode, where the comb electron plays the role of the conditioning qubit. For any N value, the amplitudes of the cat state components are proportional to the coupling constant $g_Q$. The probability to post-select a N-component cat state $$|cat_N^k\rangle_{ph}$$

is given by $$P_N^k = \frac{1}{N^2}|c_N^k|^2 = \frac{1}{N^2}\left\|\sum_{m=0}^{N-1}e^{-i2\pi\frac{km}{N}}|e^{i2\pi\frac{m}{N}}g_Q\rangle_{ph}\right\|^2. \quad (3)$$

Figure 7E:
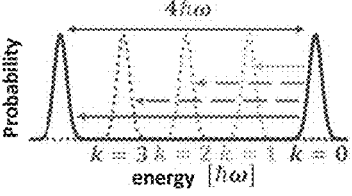
Figure 7F:
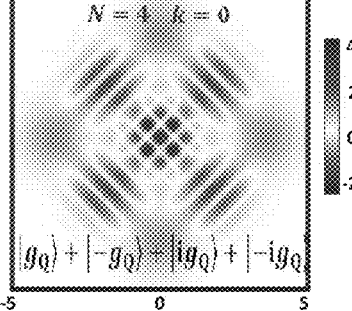

FIGS. 7E and 7F show a case where a comb electron with an energy spacing of $4\hbar\omega$ is post-selected after emitting photons of $\hbar\omega$, and the photonic Wigner function takes the form of the different four-components cat states.

Figure 7G:
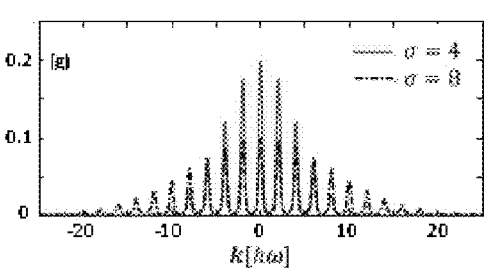
Figure 7H:
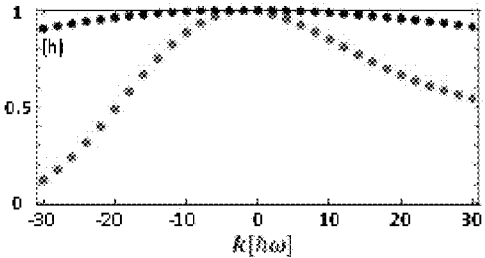

FIG. 7G shows energy spectra of Gaussian electron combs (energy spacing of $2\hbar\omega$) with a standard deviation of $\sigma=4$ (red) and $\sigma=8$ (black) in units of photon energy ($g_Q=\sqrt{\pi/2}$). Such states can be created with high fidelity by three PINEM-type interactions with classical laser light, as described in [31]. FIG. 7H shows the fidelity of the post-selected even cat states after interaction with the Gaussian comb electron. The average fidelity for $\sigma=4$ is 0.97 and for $\sigma=8$ is 0.99. The coupling constant $g_Q=4$ for all panels in FIGS. 7A to 7H. Additional examples with lower $g_Q$ values are exemplified further below.

As described above, the technique of the present disclosure further includes a post-selection procedure including number resolving measurement of the electron energies after the interaction with the photonic mode enabling to obtain the quantum photonic state (i.e., via heralding, or via feedforward and shaping adjustment). This number resolving measurement of the post-interaction electron is performed either in space or energy domain, appropriately to the given shaping technique employed (time-energy shaping requires energy measurement and space-momentum shaping requires position space measurements). To this end, electron-counting cameras can be used. One non-limiting example of such number and energy resolved measurement is Electron Energy Loss Spectroscopy (EELS). The measurement of electron energy heralds the generation of the photonic quantum state.

The technique of the present disclosure allows creation of generalized cat states with a probability of 100% and a specific phase relation with ~60%, $|g|^2$ number of photons (for the current setups ~1 photons), and fidelity 98% in the arbitrary range of frequencies determined by the cavity or waveguide. It should be noted that in general, and specifically for the generation of cat states, a strong interaction is beneficial for obtaining better quality states.

Reference is made to FIGS. 8A to 8E demonstrating an exemplary scheme for creation of the GKP state exemplifying squeezing and showing post-selection probability. To create a photonic state in a superposition of many coherent states, the inventors consider multiple comb electrons with $2\hbar\omega$ spacing $$\left(|comb_2^0\rangle_e\right)$$

interacting consequently with an optical mode. For commuting interactions, the electrons can arrive simultaneously as in a multi-electron pulse, under the condition of negligible electron-electron repulsion. For now, the optical mode is initiated with a vacuum state before the electron interactions. i.e., the electrons create the desired GKP states through a form of spontaneous emission, rather than a stimulated process.

Let us consider an interaction with (m+n) comb electrons, with n of them measured to have an odd energy and m of them measured to have an even energy. For a general initial photonic state $|\psi_i\rangle_{ph}$, the final photonic state after the interaction is:

$$|\psi_f\rangle_{ph} \propto \left(D_{g_Q} + D_{-g_Q}\right)^m \left(D_{g_Q} - D_{-g_Q}\right)^n |\psi_i\rangle_{ph} \tag{4}$$

$$\propto \sum_{n_1=0}^{m}\sum_{n_2=0}^{n} \binom{m}{n_1}\binom{n}{n_2}(-1)^{n_2} D_{g_Q}(m+n-2n_1-2n_2)|\psi_i\rangle_{ph},$$

where $$D_{g_Q} = \exp\left(g_Q\alpha^\dagger - g_Q^* a\right)$$

is the displacement operator and $$\binom{m}{n_1} = \frac{m!}{n_1!(m-n_1)!}$$

are the binomial coefficients. Eq. (4) provides the possibility to generate different superpositions of coherent states including the squeezed vacuum state.

Superpositions of coherent states that form 2D grid states are possible if considering electron combs with energy spacing higher than $2\hbar\omega$, or by having two different interaction constants. Among the different 2D grid states, the most attractive are the square and hexagonal GKP states [1,32,33]. These GKP states are desired since they enable fault-tolerant universal quantum computation with Gaussian operations. The inventors have presented several schemes for the creation of such states (Tables 1 and 2 below).

Figure 8A:
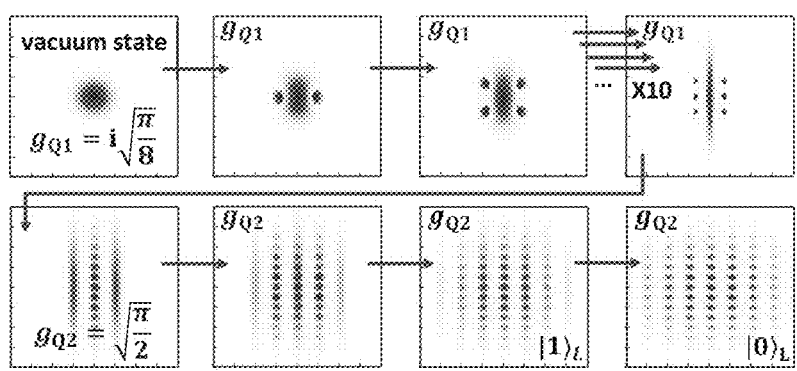

The first scheme presented herein is for the creation of square GKP states. FIG. 8A (first row) shows the evolution of the Wigner function of the photonic state after each electron interaction and post-selection. The inventors choose 4m interactions of comb electrons $$\left(|comb_2^0\rangle_e\right)$$

with coupling constant $g_{Q1}=i\sqrt{\pi/8}$, together squeezing the vacuum state All electrons are post-selected to have even energies. Then, the inventors introduce m additional interactions of electrons in the state $$|comb_2^0\rangle_e,$$

shifting the phase of the interaction by $\pi/2$, so the later interactions all have a coupling constant $g_{Q2}=\sqrt{\pi/2}$, again post-selecting even energies (FIG. 8A, second row). This transforms the squeezed vacuum state into a GKP state. Overall, the total number of electrons used in this scheme is $N_e=5m$. In order to control the coupling constant's phase, one can change the phase of the laser used to shape the electron comb or change the region of the mode with which the electron interacts. For electrons with the same coupling constant phase, the order of interaction and order of post-selection do not matter because displacement with similar directions are commutative. This fact greatly simplifies the current scheme and the ones below The resulting approximated GKP state is:

$$|GKP'\rangle_{ph}^m \propto \sum_{n_1=0}^{m}\sum_{n_2=0}^{4m} \binom{m}{n_1}\binom{4m}{n_2} D_{\sqrt{\frac{\pi}{2}}(2n_1+m)} D_{i\sqrt{\frac{\pi}{2}}(n_2-2m)}|0\rangle_{ph} \tag{5}$$

For an even/odd m, this state approximates the ideal GKP of a logical zero/one state $$|0\rangle_{ph}^{GKP}/|1\rangle_{ph}^{GKP}.$$

The ideal GKP states can be written as [32,33]:

$$|\mu\rangle_{ph}^{GKP} \propto \sum_{\vec{n}\in\mathbb{Z}} D_{\sqrt{\frac{\pi}{2}}(2n_1+\mu)} D_{i\sqrt{\frac{\pi}{2}}n_2}|0\rangle_{ph}, \tag{6}$$

where $\mu=0/1$ defines the logical GKP qubits $$|0\rangle_{ph}^{GKP}/|1\rangle_{ph}^{GKP}$$

respectively. When the number of electrons m approaches infinity, the approximated state (Eq. (5)) approaches the ideal GKP (Eq. (6)).

FIGS. 8D and 8E show the squeezing parameter and post-selection probability of the final GKP state as a function of the number electron interactions, respectively. To calculate the squeezing of the approximated state, Eq. (5) is rewritten in the x-quadrature representation:

$$GPK'(x) \propto \sum_{n_1=0}^{m} \binom{m}{n_1} \cos^{4m}\left(\sqrt{\pi}\left(x + m\sqrt{\pi}\right)/2\right) e^{-\frac{1}{2}\left(x-\sqrt{\pi}(2n_1-m)\right)^2}. \qquad (7)$$

Eq. (7) describes a series of peaks with a distance of $2\sqrt{\pi}$, shifted by $0\backslash\sqrt{\pi}$ for even\odd m. It is noted that the $\cos^{4m}$ term closely approximates a comb of Gaussian peaks (instead of delta-functions). The squeezing parameter is given by the variance of the peaks (of the corresponding probability distribution), which scales like $$\Delta_x^2 \cong 1/(1 + \pi m).$$

The corresponding squeezing parameter is defined as $$S_{dB} = 10\log_{10} 1/\Delta_x^2 = 10\log_{10}(1 + \pi m),$$

which thus grows logarithmically in the number of electrons. The inventors choose m interactions for $g_{Q2}$ and 4m for $g_{Q1}$ such that the squeezing is similar in the x and p representations.

This way, FIGS. 8D and 8E can present a single squeezing parameter by showing a datapoint every five electron interactions. The ideal $$GKP|\mu\rangle_{ph}^{GKP}$$

is obtained at the limit of m→∞. Substituting m=3 shows that $N_e$=15 electrons are required to achieve ~10 dB squeezing (FIG. 8D), which is the estimated squeezing level for fault-tolerant quantum computing (reaching the quantum error correction threshold) using CVs [34,35].

The post-selection probability to obtain the state $$|GKP'\rangle_{ph}^m$$

is (illustrated in FIG. 7E):

$$P_{|GPK'\rangle_{ph}^m} = \frac{\left\|\left(D_{\sqrt{\pi/2}} + D_{-\sqrt{\pi/2}}\right)^m \left(D_{i\sqrt{\pi/8}} + D_{-\sqrt{\pi/8}}\right)^{4m} |0\rangle_{ph}\right\|^2}{4^{5m}}. \qquad (8)$$

The post-selection probability to produce the GKP of 10 dB squeezing (m=3) according to Eq. (8) is ~10% (FIG. 8E). As expected, the probability in Eq. (8) decreases for larger m, i.e., for a larger number of electrons $N_e$. However, the probabilities decay rather slowly with $N_e$, like ~5/($N_e\pi$), which leaves us with relatively high success rates. This fact may seem somewhat surprising when recalling that the success probability of post-selecting the first electron is close to 50%, and that multiple post-selections often scale exponentially in this probability. An exponential scaling would have caused the entire scheme to be impractical, and thus it is highly encouraging to instead find a power-law scaling in the number of electrons.

Figure 8B:
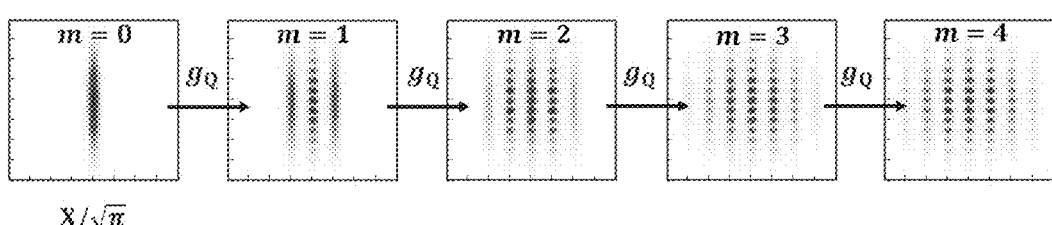

To increase the success probability of creating a GKP state further, one can stimulate the interaction with a squeezed vacuum state, described in FIG. 8B. The inventors consider a squeezed vacuum state in the initial photonic mode before the interaction $|\psi_i\rangle_{ph}=S(\xi)|0\rangle_{ph}$, with $S(\xi)$ being the squeezing operator exp $$\left(\frac{1}{2}\xi^* \hat{a}^2 - \frac{1}{2}\xi\hat{a}^{\dagger 2}\right),$$

and $\xi = re^{i\Theta}$ being the squeezing parameter. For "seeding" a squeezed vacuum into the optical mode, one can use mature techniques like spontaneous parametric down-conversion or spontaneous four-wave mixing. After the interaction of $N_e$ electrons with the squeezed vacuum state (where $g_Q=\sqrt{\pi/2}$, $\theta=0$), the resulting photonic state becomes:

$$|GKP''\rangle_{ph}^{N_e} \propto \sum_{n=0}^{N_e} \binom{N_e}{n_1} D_{\sqrt{\frac{\pi}{2}}(2n_1 - N_e)} S(\xi)|0\rangle_{ph}, \qquad (9)$$

which is an approximation of GKP states. Writing Eq. (9) in the p-representation:

$$GKP''(p) \propto \exp\left(-\frac{p^2}{2}e^{-2r}\right)\left(1 + e^{-2i\sqrt{\pi}p}\right)^{N_e}. \qquad (10)$$

The GKP state shown in FIG. 8B is alternating between the approximated $$|0\rangle_{ph}^{GKP} \text{ and } |1\rangle_{ph}^{GKP},$$

showing that each interaction resembles the X gate for the GKP states. FIG. 8C shows that the coefficients of the photonic state at every step of the process are described analytically using a Pascal triangle. This description simplifies the calculation of the post-selection probabilities in Eq. (6).

The probability of post-selecting all electrons with even energies is:

$$P_{|GKP''\rangle_{ph}^{N_e}} = \frac{1}{4^{N_e}} \sum_{n=0}^{2N_e} \binom{2N_e}{n} e^{-\pi(N_e - n)^2 |\cosh r + \sinh r|^2}. \qquad (11)$$

The probability here decays more slowly, like $1/\sqrt{N_e\pi}$, because there is one axis rather than two for the displacement interactions.

The inventors calculate the squeezing parameter of the optical GKP state as a function of the number of electrons $N_e$ and find $S_{dB}=10 \log_{10}(e^{-2r}+N_e\pi)$. To achieve 9.8 dB squeezing for the GKP state (FIG. 8D), just three electrons are needed. The post-selection probability to produce this state according to Eq. (11) is 31.25% (FIG. 8E).

The reason for the relatively high success probabilities is that the electron-photon scattering matrix S of Eq. (1) causes the quantum state to gradually converge into the ideal GKP states. The closer the photonic state reaches, the better the success probability becomes. Destructive interference in the electron wavefunction reduces the probability of the electron acquiring odd energies after the interaction, and thus increases the post-selection probability. The sequential application of the electron interaction and post-selection (with the coupling constant $g_{Q2}=\sqrt{\pi/2}$) causes a convergence into the GKP states, shifting between the $$|0\rangle_{ph}^{GKP} \text{ and the } |1\rangle_{ph}^{GKP}$$

GKP states for even and odd number of interactions respectively. Using the terminology of quantum error correction, two consequent interactions are a stabilizer for the GKP state [10]. The inventors find a similar convergence for the other GKP states for different interaction parameters as listed in Table 1. In all these cases, the interactions with comb electrons define stabilizers for the corresponding GKP states, making such fundamental interactions precisely suited for the creation of GKP states.

Tables 1 and 2 exemplify different protocols for the creation of grid coherent states using electron combs. The same line numbers in both tables describe the same protocol. Rows 1-4 describe different protocols for the creation of approximated square GKP states, with different $g_Q$ values. Row 5 shows a protocol for the creation of approximated square GKP states when starting from squeezed vacuum rather than from vacuum. Rows 6-8 show similar protocols for the creation of approximated hexagonal GKP states. $g_{Q,max}$ refers to the highest coupling constant used as part of the protocol. $P_{10\ dB}$ is the probability to achieve GKP with ~10 dB squeezing. $N_e$ is the number of electron interactions required for achieving this squeezing value. The post-selection column describes the sequence of post-selections necessary to create the state, where E/O stands for even/odd electron energies.

TABLE 2

| | Initial state | $P_{10\ dB}$ [%] | $N_e$ | Post-selection | Final state |
|---|---|---|---|---|---|
| 1 | $|0\rangle_{ph}$ | 5 | 24 | EE | $|0\rangle_{ph}^{GKP}$ |
| 2 | $|0\rangle_{ph}$ | 9.7 | 15 | EE | $|0/1\rangle_{ph}^{GKP}$ |
| 3 | $|0\rangle_{ph}$ | 11.1 | 6 | EE | $|H\rangle_{ph}^{GKP}$ |
| 4 | $|0\rangle_{ph}$ | 0.4 | 96 | EOE | $|-\rangle_{ph}^{GKP}$ |
| 5 | $S(\xi)|0\rangle_{ph}$ | 31.3 | 3 | E | $|0/1\rangle_{ph}^{GKP}$ |
| 6 | $|0\rangle_{ph}$ | 2.6 | 4.4 | EE | $|0\rangle_{ph}^{GKP}$ |
| 7 | $|0\rangle_{ph}$ | 9.5 | 6 | EEE | $|T\rangle_{ph}^{GKP}$ |
| 8 | $S(\xi)|0\rangle_{ph}$ | 27.3 | 4 | E | $|0/1\rangle_{ph}^{GKP}$ |

The approach of the present disclosure enables the creation of additional types of GKP states such as the hexagonal GKP and magic states shown in FIGS. 9A to 9C. Examples of hexagonal GKP states, an example of which is shown in FIG. 9B, are summarized in Tables 1 and 2, each requiring different coupling constants with different relative phases between the sets of interactions. The hexagonal GKP state $|0\rangle_L$ shown in FIG. 9B is described in the $6^{th}$ row in Tables 1 and 2. The magic GKP states shown in FIGS. 9A and 9C enable universal quantum computation without

TABLE 1

| | Initial state | Interaction description | $g_{Q,max}$ |
|---|---|---|---|
| 1 | $|0\rangle_{ph}$ | $\sum_{n_1=0}^{2m}\sum_{n_2=0}^{2m}\binom{2m}{n_1}\binom{2m}{n_2}D_{i\sqrt{\frac{\pi}{2}}(n_1-m)}D_{\sqrt{\frac{\pi}{2}}(n_2-m)}$ | $\frac{1}{2}\sqrt{\frac{\pi}{2}}$ |
| 2 | $|0\rangle_{ph}$ | $\sum_{n_1=0}^{m}\sum_{n_2=0}^{4m}\binom{m}{n_1}\binom{4m}{n_2}D_{\sqrt{\frac{\pi}{2}}(2n_1-m)}D_{i\sqrt{\frac{\pi}{2}}(n_2-2m)}$ | $\sqrt{\frac{\pi}{2}}$ |
| 3 | $|0\rangle_{ph}$ | $\sum_{n_1=0}^{m}\sum_{n_2=0}^{m}\binom{m}{n_1}\binom{m}{n_2}D_{\sqrt{\frac{\pi}{2}}(2n_1-m)}D_{i\sqrt{\frac{\pi}{2}}(2n_2-m)}$ | $\sqrt{\frac{\pi}{2}}$ |
| 4 | $|0\rangle_{ph}$ | $\sum_{\alpha=0}^{2m}\sum_{\beta=0}^{2m}\sum_{\gamma=0}^{4m}\binom{2m}{\alpha}\binom{2m}{\beta}\binom{4m}{\gamma}(-1)^{\beta}D_{\frac{1}{2}\sqrt{\frac{\pi}{2}}(\alpha+\beta-2m)}D_{\frac{1}{2}\sqrt{\frac{\pi}{2}}(\gamma-2m)}|0\rangle$ | $\frac{1}{4}\sqrt{\frac{\pi}{2}}$ |
| 5 | $S(\xi)|0\rangle_{ph}$ | $\sum_{n_1=0}^{m}\binom{m}{n_1}D_{\sqrt{\frac{\pi}{2}}(2n_1-m)}S(r=1.1513,\theta=0)|0\rangle$ | $\sqrt{\frac{\pi}{2}}$ |
| 6 | $|0\rangle_{ph}$ | $\sum_{n_1=0}^{2m}\sum_{n_2=0}^{2m}\binom{2m}{n_1}\binom{2m}{n_2}D_{e^{2i\pi/3}\left(\sqrt{\frac{\pi}{\sqrt3}}(n_1-m)\right)}D_{\sqrt{\frac{\pi}{\sqrt3}}(n_2-m)}|0\rangle$ | $\frac{1}{2}\sqrt{\frac{\pi}{\sqrt3}}$ |
| 7 | $|0\rangle_{ph}$ | $\sum_{n_1=0}^{m}\sum_{n_2=0}^{m}\sum_{n_3=0}^{m}\binom{m}{n_1}\binom{m}{n_2}\binom{m}{n_3}D_{\sqrt{\frac{\pi}{\sqrt3}}(2n_1-m)}D_{e^{2i\pi/3}\left(\sqrt{\frac{\pi}{\sqrt3}}(2n_2-m)\right)}D_{e^{4i\pi/3}\left(\sqrt{\frac{\pi}{\sqrt3}}(2n_3-m)\right)}|0\rangle$ | $\sqrt{\frac{\pi}{\sqrt3}}$ |
| 8 | $S(\xi)|0\rangle_{ph}$ | $\sum_{n_1=0}^{m}\binom{m}{n_1}D_{\left(\sqrt{\frac{\pi}{\sqrt3}}(2n_1-m)\right)}S\left(r=1.64,\theta=\frac{\pi}{6}\right)|0\rangle$ | $\sqrt{\frac{\pi}{\sqrt3}}$ | requiring additional non-Gaussian elements [37]. The inventors show how magic states can be created by using comb electrons. For example, for the square GKP magic state $$|H\rangle_{ph}^{GKP}$$

shown in FIG. 9A, the inventors propose a scheme involving $N_e=2m$ electrons (presented in the 3rd row of Table 1): having m interactions with coupling $g_{Q1}=i\sqrt{\pi/2}$ post-selected for even energies, followed by additional m interactions with coupling $g_{Q2}=\sqrt{\pi/2}$ post-selected for even energies. Similarly, the hexagonal GKP magic state $$|T\rangle_{ph}^{GKP}$$

shown in FIG. 9C can be created as shown in the 7th row of Table 1. FIGS. 9D and 9E show, respectively, the squeezing parameter and post-selection probability of the GKP states described in FIGS. 9A to 9C as a function of the number of electrons.

It is insightful to recast the electron-photon interaction to the language of quantum gates. Specifically, the same comb electrons used above to create the GKP state enable implementing quantum gates such as the Pauli X, Y, and Z for the GKP states. The inventors now combine this approach with the ideas developed in to induce entanglement between two photonic modes. A free-electron interaction with two photonic modes can entangle them by performing two-qubit gates (e.g., CNOT), creating a GKP Bell state. To see that, the inventors consider an electron that interacts with two photonic modes, e.g., by placing two cavities along the electron trajectory. The combined interaction is then described by two scattering matrices $S_1, S_2$, each related to the interaction with a different photonic mode.

As an example, consider the following initial state:

$$|\psi_{initial}\rangle = |0\rangle_{ph1}^{GKP}|0\rangle_{ph2}^{GKP}|comb_4^0\rangle_e,$$

which corresponds to an electron comb with a spacing of $4\hbar\omega$ and two photonic modes $$(|0\rangle_{ph1}^{GKP}, |0\rangle_{ph2}^{GKP})$$

in a GKP state. Following the interaction of this electron comb with both modes, the electron energy is post-selected. The result is:

$$\begin{cases} |+\rangle_{ph1}^{GKP}|+\rangle_{ph2}^{GKP} + |-\rangle_{ph1}^{GKP}|-\rangle_{ph2}^{GKP}, & \text{for post-selecting } |comb_4^0\rangle_e \\ |+\rangle_{ph1}^{GKP}|-\rangle_{ph2}^{GKP} - |-\rangle_{ph1}^{GKP}|+\rangle_{ph2}^{GKP}, & \text{for post-selecting } |comb_4^2\rangle_e \end{cases} \quad (15)$$

Both options are GKP Bell states. Post-selecting the electron will generate one of these Bell states, according to the measured electron energy. The electron state $$|comb_4^0\rangle_e$$

acts like a conditional rotation gate for the GKP square state (similarly, for the hexagonal-GKP state, $$a|comb_6^0\rangle_e$$

can be used). Looking forward, this scheme can be generalized to entangle a larger number of states and even to create GKP cluster states.

It should be understood that the generation of all the above states of light can be realized using a single mathematical entity, the conditional displacement operator. The present disclosure demonstrates how the realization of conditional displacement operator can be created using energy-modulated corm-electrons.

Consider electron comb with an energy spacing of $2 \cdot \hbar\omega$ such that $|\psi_{electron}\rangle \propto$ $$\sum_{n=-\infty}^{\infty} |E_0 + 2 \cdot N \cdot \hbar\omega\rangle.$$

In this case, the ladder operator b satisfies an important relation:

$$\langle\psi_{electron}|b|\psi_{electron}\rangle \approx 0, \langle\psi_{electron}|b^2|\psi_{electron}\rangle \approx 1$$

Any electron state which approximately realizes this relation is applicable for the schemes of the technique of the present disclosure. In this case, the ladder operator b can be written as a Pauli matrix $\sigma_x$, where the states $|0\rangle$ and $|1\rangle$ are defined as $|\psi_{electron}\rangle$ and $b|\psi_{electron}\rangle$ accordingly. The states $|0\rangle$ and $|1\rangle$ can be distinct using electron energy measurements. In this case, the electron-photon interaction can be rewritten as:

$$S = \exp[g\sigma_x a^\dagger - g * \sigma_x a]. \quad (16)$$

This operator is the well-known conditional displacement operator. This operator, combined with projective measurements of the associated $|0\rangle$ and $|1\rangle$ states enables the generation of the states of light described above and more. The inventors have found that electron energy shaping, and electron energy measurements can provide the conditional displacement operator and the projective measurements necessary for the generation of valuable non-Gaussian states of light.

The following is the description of the realization of the conditional displacement operator in lower electromagnetic frequencies.

When the energy of a photon is significantly smaller than the energy spread of the electron (as happens naturally in THz, microwave, and radio frequencies), appropriate energy modulations might not be accessible, and the above procedure, described in relation to the optical range from IR to higher frequencies, might not be applicable. In the case of the lower frequencies (THz, microwave, and radio frequencies), when emitting a photon, the electron does-not change significantly and the b operator can be omitted from electron-photon interaction matrix and it can be rewritten as $$S = \exp\left[g\alpha^\dagger - g * a\right].$$

This operator is also known as the displacement operator D(g). Luckily, there is an additional degree of freedom in this interaction. Parameter p is in-fact a function of space in the direction transverse to the electron propagation (noted here as the z axes), and so it can be replaced to g(x,y). The size and phase of g are proportional to the relative size of phase of the relevant electromagnetic mode under consideration. The value of g changes in size on scales comparable to the radiation wavelength, which in the present case is ranging from few microns to few centimeters, and so it is easy to focus the electron into an effectively a single point.

In the general case, the electron can be written as a sum of free electrons focused into a single point x,y, $$\left|\psi_{electron}^{(x,y)}\right\rangle \text{ such that } \left|\psi_{electron}\right\rangle = \int dx dy g(x, y)\left|\psi_{electron}^{(x,y)}\right\rangle.$$

If the initial electron-light state is given by $|\psi_{electron}\rangle\,|\psi_{light}\rangle$, the final state can be calculated as:

$$\int dx dy g(x, y) \left|\psi_{electron}^{(x,y)}\right\rangle D(g(x, y))\left|\psi_{light}\right\rangle. \qquad (17)$$

Thus, the inventors have found that the displacement operator acts on the light-state for different transverse locations of the electron. This can be utilized to generate the desired quantum light. This provides ability to measure the electron in a basis that is not y, thus mixing the operators acting on the light, potentially creating non-Gaussian operators.

The inventors have considered one specific case, by splitting the electron into two points, for example using a bi-prism of an electron beam-splitter, such that the wavefunction of the electron can be described by two transverse points as $$\left|\psi_{electron}\right\rangle \propto \left|\psi\right\rangle_{right} + \left|\psi\right\rangle_{left},$$

noting the left and right positions of the electron. In this case, each point (left/right) is associated with different coupling constant $g_{left/right}$, and the post-interaction state can be written as:

$$\left|\psi\right\rangle_{right} D(g_{right})\left|\psi_{light}\right\rangle + \left|\psi\right\rangle_{left} D(g_{left})\left|\psi_{light}\right\rangle. \qquad (18)$$

Reference is made to FIGS. 10A to 10C exemplifying two configurations where such interaction can happen. These figures show a protocol for conditional displacement using spatial electron-wavefunction modulation, FIG. 10A shows that the free electron wavefunction can be split into two, for example using a bi-prism. Then only one of the trajectories interact with a cavity with coupling constant g s.t. $g_{right}=0$, $g_{right}=g$. FIG. 10B shows that, alternatively, a cavity with anti-symmetric mode can be employed, in which case the two electron paths can be focused into different parts of the cavity s.t $g_{right}=g$, $g_{right}=-g$. FIG. 10C illustrates that the two electron paths are then sent to an electron beam splitter/combiner which mixes the paths and sends the output into two spatially separated electron counting detectors.

Thus, performing a measurement which can distinguish between the states $$\left|\psi\right\rangle_{right} + \left|\psi\right\rangle_{left} \text{ and } \left|\psi\right\rangle_{right} - \left|\psi\right\rangle_{left},$$

is equivalent to performing a conditional displacement operator followed by projective measurement. Such measurement can be performed by sending the electron into an additional electron bi-prism of a beam-splitter (FIG. 10C). Hence, it can be seen that shaping of the free electron spatial wavefunction enables the extension of quantum light generation into other frequencies. This scheme is also applicable in higher frequencies, given that the electrons are additionally modulated into energy combs.

In the following the fidelity of the cat and GM) states is estimated.

Different considerations can lower the fidelity in practical settings, including detectors efficiencies, deviation from ideal comb, variance in the constant coupling $g_Q$, the bandwidth of the optical mode (or multimode), dispersion of either the electron or the photonic modes, aberrations for the temporal and transversal electron beam focusing, and electron-electron repulsion.

The technique of the present disclosure is robust. Indeed, let us consider a standard deviation $\Delta g_Q$ in the value of $g_Q$ (the variation is taken to be in the amplitude for this example). Such deviations in PINEM experiments result from transverse non-uniformities in the field $E_z(r_\perp, z)$, or changes of the interaction length. The inventors have found that the fidelity for the case of a two-component cat state goes like $$\propto 1 - \Delta g_Q^2,$$

with $\Delta g_Q < 0.25$.

The fidelity is also limited by the quality of the comb electron. Any Gaussian comb has two characterizing features: its envelope width and the energy width of the individual peaks (coherent and incoherent broadening). The width of each energy peak can create an error in the detection due to some overlap between adjacent peaks. For high fidelity, the ratio between the energy of the photon and the standard deviation of each peak should be above three standard deviations for error rates below 1%. For the telecom range, the photon energy is 0.8 ev, this means that the standard deviation of the electron energy width of each peak should be ~0.13 eV (~0.3 eV FWHM), which is achievable in TEM and even UTEM).

Another consideration is the finite energy width of realistic electron combs that approximate the infinite width of the ideal comb. A wider electron comb increases the fidelity (FIG. 7H), but only up to a certain propagation distance, because a wider comb experiences stronger dispersion that distorts the phases of the comb peaks, limiting, the fidelity. Strong coupling ($q_Q > 0.1$), as necessary for GKP generation, requires long phase-matched interactions [26,22,], on the order of a hundred microns (for 200 keV electron combs and photons of 1550 nm). Since the phase-distortion by dispersion grows linearly with the distance, there exists a different optimal electron energy width for each interaction distance and each required fidelity. i.e., too wide a comb will in fact smear the phase due to electron dispersion, resulting in lower fidelities. These considerations create an inherent trade-off between the fidelity and coupling strength $g_Q$. The results obtained by the inventors show that despite this trade-off, there is a wide range of parameters for which the photonic states necessary for CV fault-tolerant quantum computing can be created.

To provide concrete fidelity estimates for GKP states created by approximated electron combs, the inventors considered a Gaussian envelope for the electron energy spectrum as in [31]. The Gaussian envelope is preferable since it maximizes the first moments while minimizing higher-order moments of the electron energy spectrum. The inventors estimate that creating an approximate GKP state (Eq. (5)) with 98% fidelity requires a standard deviation of 30 peaks. As an example, consider such an electron with mean kinetic energy of 200 keV. The distance between the electron energy peaks is chosen to match the energy of a photon at 775 nm, so the emission is into a GKP state at 1550 nm. The fidelity of the GKP state created by such a comb can remain above 97% for an interaction distance of up to 160 μm. Such a distance is sufficient to create the strong coupling strength $g_Q$ as was predicted in [26].

Turning back to FIGS. 5A-5C, it should be noted that the electron preparation stage (shaping stage) might utilize multiple harmonics [30] or multiple interactions [31] in order to shape the electrons into high-quality combs. Strong electron shaping can be obtained using a continuous-wave laser [24,25], instead of the short laser pulses. This allows for coherent electron shaping (i.e., temporal modulation) with less complicated synchronization for the interactions between the electron and the shaping light. Also, the continuous-wave interaction may utilize grazing angle conditions for phase-matched or quasi-phase-matched interactions. Such grazing angle conditions might be implemented using strong electron lenses to create a small electron beam diameter together with small convergence angles. These conditions can be met in specialized TEM with multiple objective lenses. The light emission stage might need strong coupling ($g_Q > 0.5$) between the electrons and the optical mode. To this end, electron interaction with micro-cavities [26] or with photonic crystal flat-bands can be used [37], or to achieve even higher coupling value of $g_Q$ (even much above unity), a longer phase-matched interaction and a highly confined optical mode can be used [26]. The inventors have shown that the interaction length of the order of 150 μm may be used for a large enough $g_Q$. Further, a substantial part of the optical mode is preferably located in a vacuum and has a longitudinal polarization to ensure efficient evanescent coupling to the electron. These interaction conditions also depict the timescale over which the emission occurs, which in the case of a 160 μm structure and 200 keV electrons is ~800 fs. This timescale also corresponds to the bandwidth of the emitted radiation, which is about ~10 nm for emission at 1550 nm. The photonic losses are negligible over the interaction length and time scale, as is indeed the case in state-of-the-art dielectric waveguides and microcavities.

As described above, the inventors considered that the electron interacts with only one optical mode. i.e., the electron coupling strength ($g_Q$) with a specific mode is much larger than with other modes. Satisfying this assumption necessitates a carefully designed structure, which may be achieved by exploiting methods of nanophotonic design.

The inventors also considered enhancing the interaction with a single desired mode by pumping it with a weak coherent state, or a weakly displaced squeezed vacuum. Alternatively, the GKP states can be created such that each photon is a superposition of multiple spectral modes. In such scenario, the coherent width of each electron energy peak is to be wider than the spectral width of the photon emission. The coherent energy width of electrons emitted from typical cathodes is on the order of 0.3 eV [38]. The phase-matching condition imposes a minimal interaction length of ~30 μm to reduce the spectral width between the emitted modes to below 0.3 eV.

The electron post-selection stage necessitates coincidence measurements and direct detection of individual electrons. Such measurements are facilitated by the use of electron counting direct detectors, e.g. single-photon detectors. One advantage of free-electron generation of GKP states arises from the developments in fast electron counting detectors (direct detection schemes). Since free electrons are energetic particles, it is in principle easier to detect multiple electrons than achieve a similar detection with photons. This enables measuring simultaneous/rapid multi-electron interactions as used in the schemes described above.

It should be noted that the technique of the present disclosure provides a very general paradigm that can be formulated as follows: a modulated particle (boson or fermion), shaped into a superposition of multiple energies, interacts with some electromagnetic mode or radiates an electromagnetic mode, and is possibly post-selected using energy spectrometer. Therefore, the technique of the present disclosure can be embodied using other elementary particles, besides electrons and using other methods of interaction:

Quantum light can be created according to the technique of the present disclosure using a photon comb and a nonlinear interaction. Instead of a charged particle providing a superposition of energies, a photon can be used in the form of a superposition of frequencies. Such superpositions can be created regularly in frequency combs, in microcavities, etc. Frequency combs can be created by high-harmonic generation. Here, the creation of quantum light is accomplished using a nonlinear interaction of the frequency-comb photon, which creates photons in another photonic/bosonic state.

The nonlinear interaction can be of the following types: chi(2) ($\chi^{(2)}$), chi(3) $\chi^{(3)}$), SPDC (Spontaneous Parametric Down Conversion), SFWM (Spontaneous Four-Wave Mixing).

The created quantum light can be in the form of phonons/acoustic vibrations/mechanical oscillations/microwave/another optical mode. Respectively, a phonon comb can be used as the source to take part in the nonlinear interaction. The photon states here and in all other schemes can be replaced by other types of bosons.

In addition, beams of atoms/molecules can be used instead of charged particles, i.e. very cold atomic/molecular beams can be shaped into a comb superposition of multiple energies. Such beams can then interact with cavities (often high-Q) to emit radiation at low frequencies such as microwaves or high frequencies such as optical photons. The atoms '/molecules' electronic/phononic/excitonic transitions provide a strong resonance to enhance the cross-section of interaction with light. This way the strong coupling can be achieved as required for the operation of the above-described schemes. The post-selection can be achieved either in energy space or momentum space (e.g., via diffraction). The atoms can be prepared in the Bose-Einstein condensate state with negligible interaction between atoms (which is called "atom laser") which are cooled down using the laser cooling technique. Such atomic lasers can produce coherent pulses of atoms with an operating frequency of about 200 Hz and $10^5$-$10^6$ atoms inside each pulse. Thus, the scheme can be generalized so that the emitted cat state is made from atoms, as in Bose-Einstein condensates.

The enemy combs described above can be implemented by superposition in angle, as in electron diffraction from a grating/crystal. Here, the energy superposition is replaced by a superposition of another quantum parameter such as space/angle/momentum. The difference between the quantum parameters is designed in the same way as described above, chosen to be an integer multiple of the parameter of the emitted photon. The emitted radiation thus contains the desired quantum state in this parameter, for example, a photon with multiple angles/directions, or at different locations. Such electrons can be created with electron phase masks or electron amplitude masks, or various other ways of electron shaping known in the art.

Thus, the technique of the present disclosure provides for using coherently shaped free particles to generate light with the desired quantum properties. Such a type of light has various potential applications in the market.

These include, for example, the creation of entangled photons to improve biological sensing, quantum sensing, quantum metrology, and creation of cluster states of light as the main resource of measurement-based quantum computers; creation of entangled photons and cluster states of light to implement quantum teleportation and quantum search algorithms on photons or implement quantum cryptographical protocols on entangled states and secure quantum channels of communications. Also, the creation of non-Gaussian states of light may be applicable in the creation of cat states, GKP states, and coherent grid states for fault-tolerant quantum computing; non-Gaussian communication channels; quantum metrology with non-Gaussian states of light.

In the following, the use of free electrons as matter ancilla qubits for conditional displacement on photonic states is described.

Figure 11A:
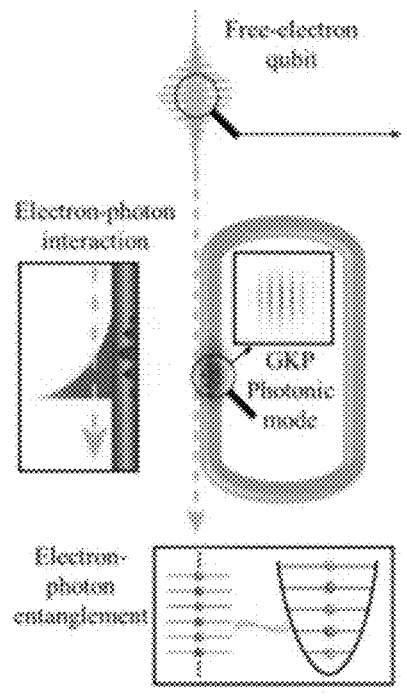
Figure 11B:
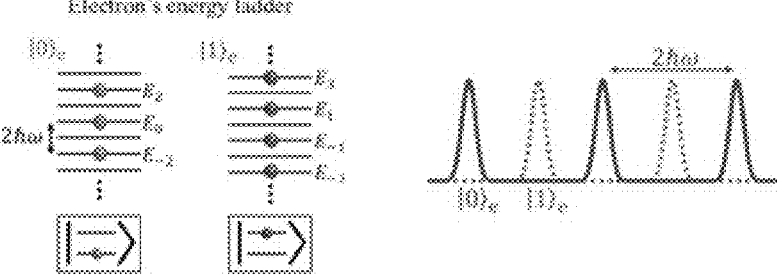
Figures 11C, 12A, 12B, 12C:
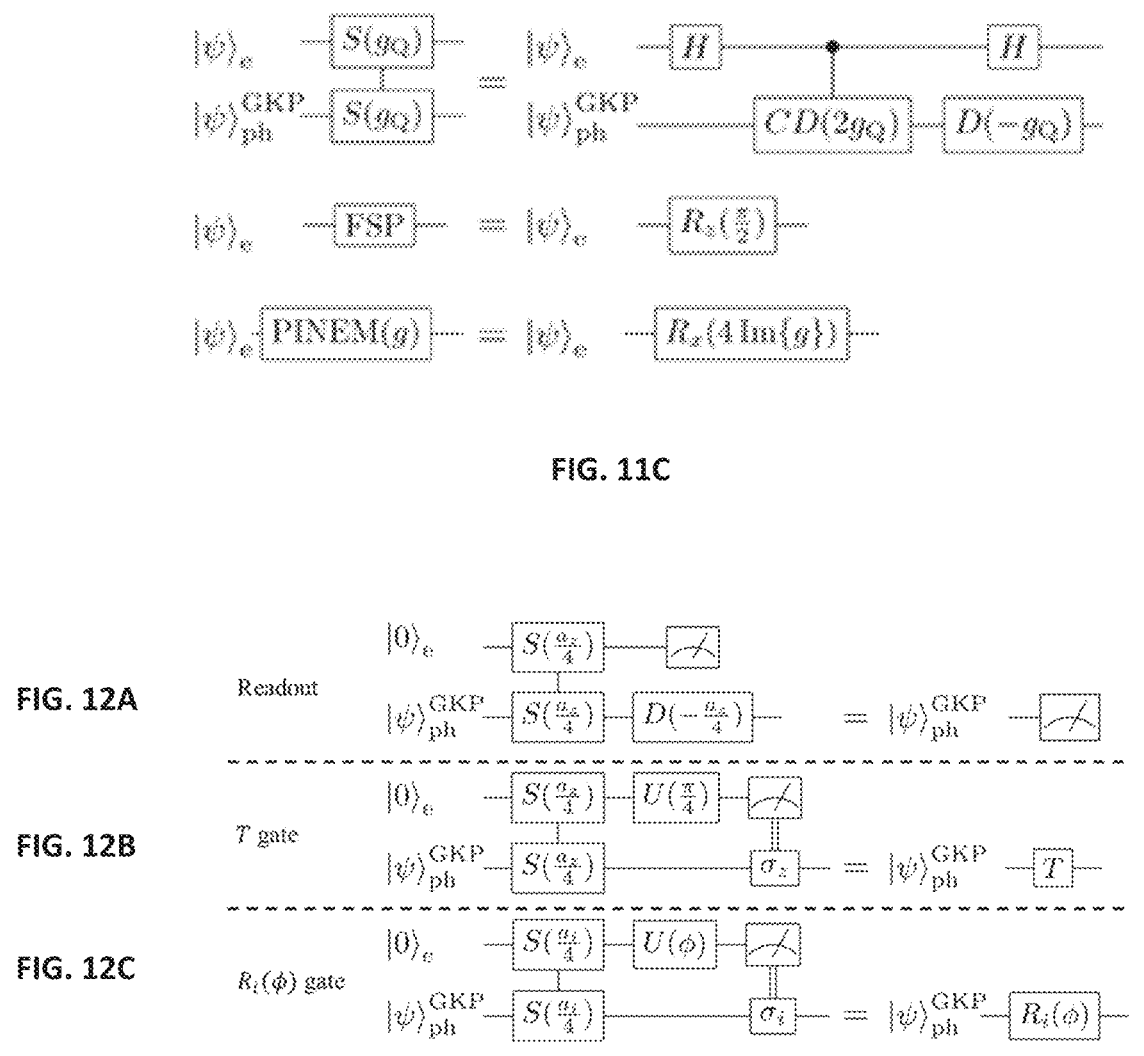

Reference is made to FIGS. 11A to 11C describing the free-electron-photon interaction as a fundamental building block for quantum information processing. FIG. 11A shows the free electron pre-shaped into a free-electron qubit state, which interacts with the photonic mode through a near-field coupling (in a photonic structure). The photonic mode contains a GKP state (e.g., created by one of the techniques described above). The interaction entangles the electron with the GKP state. FIG. 11B shows the free-electron qubit states by their energy spectra, as the even (blue, qubit $|0\rangle_e$) and odd (red, qubit $|1\rangle_e$) comb electrons with $2\hbar\omega$ energy spacing.

Specifically, the inventors define the electron coherent energy comb as a superposition of electron energy states with a Gaussian envelope around a central energy $E_0$, $$|comb_{\sigma,\phi}^\omega\rangle \propto \sum_n e^{-\frac{n^2}{2\sigma^2}} e^{i\phi n} |E_0 + n\hbar\omega\rangle. \qquad (19)$$

Here $|E_0\rangle$ is the state of an electron with narrow (compared to $\hbar\omega$) energy distribution around the energy $E_0$, $\omega$ is the modulating laser frequency, $\sigma$ is dimensionless and shows the effective number of energy states in the electron comb, and $\phi$ is the electron phase controlled by the laser phase. Here, the inventors consider the limit of $\sigma\rangle\rangle\hbar\omega$, and omit the $\omega$ in the electron comb notation. In this case, the electron comb becomes an approximate eigenstate of the energy displacement operators $$b_\omega, b_\omega^\dagger \text{ (satisfying } b_\omega b_\omega^\dagger = b_\omega^\dagger b_\omega = 1\text{),}$$

which describe an electron translation in energy of $\hbar\omega$, which correspond to the emission or absorption of a single photon [26] respectively.

The electron comb can be described as a qubit with the following basis:

$$|0\rangle_e = |comb_{\phi=0}^{2\omega}\rangle, |1\rangle_e = b_\omega |comb_{\phi=0}^{2\omega}\rangle. \qquad (20)$$

The inventors denote $|\psi\rangle_e = \alpha|0\rangle_e + \beta|1\rangle_e$ as a general free-electron qubit state. The $|0\rangle_e$ state can be generated via a typical electron comb generation scheme [30,31] using a modulation laser with frequency $2\omega$. Universal single-qubit gates [41] over such free-electron qubit states are achievable by multiple PINEM interactions separated by free-space propagation, i.e., drift. Free-space propagation over an appropriate distance corresponds to a rotation around the Z axis on the Bloch sphere, and PINEM interaction corresponds to a rotation around the X axis on the Bloch sphere [41].

FIG. 11C shows the building blocks for universal quantum computation on the free-electron qubit and a GKP state (left) and their corresponding circuits (right). The first is the interaction scattering matrix, the second is the free space propagation (FSP) operation on the electron, and the last is the PINEM operation on the electron which describes interaction with classical coherent light.

Coming back to the analogy of coherent light, if the energy translation operator $b_\omega$ is considered, then the electron qubit states are eigenstates of $$b_\omega^2$$

and satisfy $\langle i|_e b_\omega |i\rangle_e \approx 0$ with i=0,1, similar to ladder operators acting on optical cat states. This observation creates an analogy between the creation of GKP states and cat breeding protocols.

To describe the interaction of such modulated electrons with quantum photonic states, the inventors quantize the electromagnetic field, as presented theoretically in [26,27] and some aspects were demonstrated experimentally in [24]. This interaction can be described using the following scattering matrix:

$$S(g_Q) = D(g_Q b_\omega) = e^{g_Q b_\omega a^\dagger - g_Q^* b_\omega^\dagger a}. \qquad (21)$$

Here $q_Q$ is the coupling between the free electron and the photonic mode; its amplitude $|g_Q|$ is controlled by the distance between the free electron and the mode and its phase $\angle g_Q$ by the modulating laser phase. a, $a^\dagger$ are the annihilation and creation operators for the photonic mode.

$$b_\omega, b_\omega^\dagger$$

are displacement operators for the free electron's energy, which unlike the photonic operators simply commute $$[b_\omega, b_\omega^\dagger] = 0. \quad D(\alpha) = \exp(\alpha\alpha^\dagger - \alpha^*\alpha)$$

is a coherent displacement operator.

For the free-electron qubit, $$b_\omega = b_\omega^\dagger = \sigma_x$$

(refer to FIG. 11B). The scattering matrix in Eq. (21) is then reduced to a conditional displacement (CD) operator, controlled in the X basis:

$$S(g_Q) = D(g_Q\sigma_x) = |+\rangle_e\langle+|_e \otimes D(g_Q) + |-\rangle_e\langle-|_e \otimes D(-g_Q) = \qquad (22)$$
$$\frac{1}{2}((D(g_Q) + D(-g_Q))I + (D(g_Q) - D(-g_Q))\sigma_x) = CD(g_Q).$$

In the following it is shown how the free-electron qubit can be used as an ancilla qubit in manipulating GKP states in a wide range of frequencies, most interestingly in the optical range.

The inventors focus on the case where the photonic mode is an ideal GKP state. GKP states form a lattice in their Wigner representation and can be defined by the lattice constants $a_{x,y,z}$. Stabilization of the GKP code can be achieved with the CD operator from Eq. (22). To create the stabilizers, $g_Q$ should be chosen as a lattice constant $q_Q = \pm a_i$. These choices are analogous to the case of regular CD operations based on qubit ancillas [2]. The Hadamard (H) gate on the GKP state can be achieved by adding $\pi/2$ phase to the required $g_Q$ in next computation steps [46].

When $g_Q = a_i/4$, Eq. (22) gives a controlled Pauli gate $\sigma_i$ on the GKP state, controlled by the electron's state in the X basis, with the added overall displacement $D(-a_i/4)$ that needs to be corrected (in post-processing). As an example, the CNOT gate between the free electron and the GKP state is given by $g_Q = a_x/4$:

$$CNOT_{e \to ph} = (H_e \otimes D(-a_x/4))S(a_x/4)(H_e \otimes I). \qquad (23)$$

Controlled Pauli gates give the ability to create maximum entanglement between the electron qubit and the GKP state. Moreover, controlled Pauli gates can be used to read out the GKP state by measuring the electron's energy as an ancilla.

Reference is made to FIG. 12A exemplifying the implementation of single-qubit gates induced by the free-electron ancilla. Specifically, FIG. 12A shows the readout operation: using electron ancilla qubit with interaction $$g_Q = \frac{a_z}{4},$$

followed by a measurement of the electron to extract the GKP state as described above.

The CD operator can be used to implement a universal set of gates on the GKP state with an additional non-linearity. The non-linearity comes from the feedforward mechanism, where the next operation is done according to the electron's measurement result. Rotation gate around t=x, y, z axis with angle $\phi$, $R_i(\phi)$, is achieved with teleported gates by an ancilla qubit [46], as shown in FIG. 12C. The initial state of the electron is $|0\rangle_e$. The electron interacts with the GKP state with $$g_Q = \frac{a_i}{4},$$

i=x, y, z according to the rotation axis, and then measured in the $|\phi_\pm\rangle_e = 1/\sqrt{2}(e^{i\phi/2}|0\rangle_e \pm e^{-i\phi/2}|1\rangle_e)$ basis. The ability to coherently control the electron's qubit state [41] allows measuring it in any desired basis, with additional drift and PINEM interactions for the post-interaction electron. If the measurement result is $|\phi_-\rangle_e$, the Pauli gate $\sigma_i$ is applied to the GKP state, and if the measurement result is $|\phi_+\rangle_e$ there is no need to apply any gate. The S and T gates can be achieved by rotations around the Z axis, with the angles $$\frac{\pi}{2} \text{ and } \frac{\pi}{4},$$

respectively.

FIG. 12B shows implementation of T gate: using electron ancilla with interaction $$g_Q = \frac{a_z}{4}$$

performing a controlled-phase gate on the GKP state, with the electron being the control qubit. Then the electron is measured in the basis $$|\pi/4_\pm\rangle = \frac{1}{\sqrt{2}}\left(e^{\frac{i\pi}{8}}|0\rangle_e \pm e^{-\frac{i\pi}{8}}|1\rangle_e\right),$$

using the unitary $$U\left(\frac{\pi}{4}\right).$$

The double line denotes classical feedforward, i.e., if the measurement result is $|\pi/4_-\rangle$, the Pauli $\sigma_z$ gate is applied.

Furthermore, FIG. 12C shows implementation of rotation gate $R_i(\phi)$ in the i=x, y, z direction: using tree-electron ancilla with $$g_Q = \frac{a_i}{2}$$

performs the gate controlled-Pauli ($C\sigma_i$) on the GKP state, with the electron being the control qubit. Then the electron is measured in the basis $$|\phi_\pm\rangle = \frac{1}{\sqrt{2}}\left(e^{\frac{i\phi}{2}}|0\rangle_e \pm e^{-\frac{i\phi}{2}}|1\rangle_e\right),$$

using the unitary U($\phi$). For feedforward, if the measurement result is $|\phi_-\rangle$, the Pauli $\sigma_i$ gate is applied.

Table 3 below describes the operations on the photonic state that are created by a free-electron ancilla for universal quantum computation. Row 1 describes the coupling constant and electron state needed for creating Pauli gates $\sigma_i$ on the GKP state. Row 2 describes how to use the electron qubit for the readout of the GKP state. Row 3 is the rotation gate $R_i$, created using a teleported gate with feedforward. Row 4 shows how to use two electron qubits to create a CNOT gate between two GKP states in different photonic modes.

TABLE 3

| Operation | $g_Q$ | | Electron state | Feedforward |
|---|---|---|---|---|
| Pauli gates $\sigma_i$ | $a_i/2$ | | $|+\rangle_e$ | no |
| Readout in i basis | $a_i/4$ | | $|0\rangle_e$ | no |
| Rotation $R_i$ ($\phi$) | $a_i/4$ | | $|0\rangle_e$ | If $|\phi_+\rangle_e$ is measured - success |
| | | | | If $|\phi_-\rangle_e$ is measured - $\sigma_i$ gate |
| CNOT$_{ph1\rightarrow ph2}$ | $g_{Q,1} = \dfrac{a_z}{4}, g_{Q,2} = \dfrac{a_x}{4}$ | | $|0\rangle_e$ | if $|0\rangle_e$ is measured - success |
| | | | | If $|1\rangle_e$ is measured - $\sigma_z$ gate |

Altogether, the free-electron qubit ancilla enables the operation of unitary gates, stabilizers, and readout on the GKP states. These building blocks enable universal quantum computation and quantum error correction [2] using the fundamental free-electron-photon interaction, which can be implemented and controlled in ultrafast electron microscopes [22,31,24].

It should be noted that free electrons can be used to improve the GKP states generation utilizing post-selection based on number-resolving photodetectors [35]. In such probabilistic scheme, when the creation fails, there is a squeezed vacuum state instead of a GKP. Such situations replace the multi-GKP cluster state with a partially mixed state, lowering the fidelities and the computational accuracy. The technique of the present disclosure provides a method to increase these fidelities using free-electron interactions, as follows.

Let us define a successful event as a generation of a GKP state $$|0\rangle_{ph}^{GKP},$$

and a failure as a generation of a squeezed vacuum state $$|0\rangle_{ph}^{S}.$$

The quantum state can be written as:

$$\rho_1 = P_s|0\rangle_{ph}^{GKP}\langle 0|_{ph}^{GKP} + (1-P_s)|0\rangle_{ph}^{S}\langle 0|_{ph}^{S}. \quad (24)$$

Here $$|0\rangle_{ph}^{S}$$

is a squeezed vacuum state and $P_s$ is the probability of success in creating GKP state. The fidelity between this state and a GKP state is $\sim(P_s+(1-P_s)\cdot 0.51)$. To improve this fidelity, the following free-electron-based error correction protocol can be implemented. The inventors let the state interact with a free electron in the state $|0\rangle_e$ with $g_Q=\sqrt{\pi/2}$ and measure the electron. Then, by applying an additional feedforward interaction with an additional electron $|+\rangle_e$ with $$g_Q = \frac{1}{8}\sqrt{2\pi},$$

this fidelity can be raised to $\sim(P_s+(1-P_s)\cdot 0.77)$. Consequently, current schemes for venerating GKP states can be revisited in the optical range that do so with low success probabilities and provide a deterministic increase in fidelity of close to 50%. This procedure enables further improvement of almost any scheme that generates GKP states.

In the following the inventors detail how the free electron considered as a flying qubit may be exploited for the creation of GHZ and cluster states.

The unique property of a free-electron qubit as a flying qubit is that just one electron ancilla can be used for entangling multiple GKP states. In this connection reference is made to FIGS. 13A and 13B exemplifying free-electron-based correction protocol to improve the fidelity of a GKP generation scheme. FIG. 13A shows the electrons interaction with a squeezed vacuum state (left) and a GKP state (right). In both options, the electrons increase the fidelity of the output photonic state relative to a GKP state. FIG. 13B shows the fidelity (relative to a GKP state) as a function of $P_s$, where $P_s$ is the probability of generating a GKP state, and $1-P_s$ is the probability of generating squeezed vacuum state. The fidelity is shown without free-electron-based correction protocol (dashed line) and with such protocol (solid line), showing a deterministic increase in fidelity of close to 50%.

The protocol for a CNOT$_{ph1\rightarrow ph2}$ gate between two GKP states in two separated photonic modes, where one electron qubit interacts with two GKP states. The electron starts in the state $|0\rangle_e$ and interacts with the first GKP state with $$g_Q = \frac{a_z}{4},$$

then changes the basis using a Hadamard gate ($H_e$) on the electron, and then interacts with the second GKP state with $$g_Q = \frac{a_x}{4}.$$

The last step of the protocol for CNOT$_{ph1\rightarrow ph2}$ uses feedforward: the electron is measured, and if the measurement result is $|0\rangle_e$, then nothing is applied; but if the measurement result is $|1\rangle_e$, then a Pauli $\sigma_z$ gate is applied to one of the GKP states. The CNOT$_{ph1\rightarrow ph2}$ and the universal set of one qubit gates described above are sufficient for universal quantum computing.

The maximally entangled GHZ state can be produced using one electron qubit interacting with multiple photonic GKP states. Each interaction is a $CNOT_{e \to ph}$, which can be implemented with $g_Q = a_x/4$, as presented in Eq. (23). In the final step of creating the GHZ state, the Hadamard gate is applied to the electron. The electron is then measured in the X basis to disentangle it from the GKP states. Ultimately, the $D(-a_x/4)$ correction must be applied by using one $|+\rangle_e$ electron with $$g_Q = -\frac{a_x}{4}$$

interacting with all the GKP states.

The procedure is exemplified in FIGS. 14A-14C realized using photonic cavities or a waveguide. These figures show the schemes of creation of multiqubit entanglement using free electrons, where FIG. 14A shows $CNOT_{ph1 \to ph2}$ gate between two GKP states, FIG. 14B shows the scheme for generating a GHZ state of three GKP states, and FIG. 14C shows two approaches for implementing the GHZ state: stationary GKP states in cavities (left) and propagating GKP states in a waveguide (right).

For the waveguide approach, the distance between the interaction points needs to match the electron's path, such that the electron will interact with the GKP states. Also, the GKP states must be all phase-matched to the electron.

Another aspect is the ability to use free electrons to create the cluster states needed for measurement-based quantum computation schemes. In recent years, much effort has been invested in measurement-based photonic quantum computation, specifically in the optical range. Such schemes require the efficient generation of photonic states and their entanglement into cluster states. Clusters of GKP states [35] are especially desirable because they are robust against photon loss errors.

In an exemplary protocol, one can add appropriate propagation distances between the subsequent interactions in the GHZ-creation scheme (shown above) to create a 1D cluster of GKP states from the interactions of a single electron. Additionally, combining multiple electron channels can create 2D and potentially higher dimensional cluster states. Consequently, free-electron interactions provide all the necessary components to perform measurement-based photonic quantum computation.

Thus, the technique of the present disclosure provides the schemes for coherent interaction between free electrons and optical GKP states enabling projective measurements and universal control over the GKP states. It also provides the use of interaction of multiple GKP states with the same electron enabling creation of highly entangled states such as GHZ and cluster states. The key to these possibilities is the creation of conditional displacement mechanism based on the electron interaction. The free-electron implementation provides additional degrees of freedom to the interaction due to the intrinsic nature of the free electron as a flying qubit.

Although the free electron ancilla qubit provides similar abilities to the circuit QED and trapped ion counterparts, the most significant difference between them is that the free electron ancilla is a flying qubit [2]. This allows for high connectivity between the electron and multiple spatially separated photonic modes. This provides generation of highly entangled GHZ and cluster states with only one ancilla electron. This is in strong contrast to other systems, such as circuit QED and trapped ions, where the entangling of two or more GKP states requires entanglement between multiple ancilla qubits [3], or multimode coupling [47], which further limits the coherence times of the bosonic code and exponentially complicating the physical realization.

The flying qubit nature of the electron also implies that it interacts with the GKP state only for a short time, which means that the coherence time of the stored qubit is not limited or shortened by the electron, unlike circuit QED systems, for example, which limit the coherence time of the cavity mode to that of the transmon .

The closest analogy to the interaction between free-electron qubits and GKP states is a beam-splitter interaction with optical cat-states [6]. A significant difference is that the creation of free-electron qubits does not require a non-linear component and is generally accessible in all frequencies. Another advantage of free-electron based schemes compared to optical ones arise from the developments in fast electron counting detectors (direct detection schemes). Since free electrons are energetic particles, it is easier to detect multiple electrons than achieve a similar detection with photons.

The free electron qubit states presented in Eq. (20) can be generalized to multi-level qubits by changing the modulating laser frequency from $2\omega$ to $N \cdot \omega$, where N is an integer corresponding to the number of desired levels [44]. Such electron states are analogous to N-legged cat states, which are extremely difficult to generate and can provide additional degrees of freedom that can be exploited for the generation and control of bosonic GKP states. As described above, the technique of the present disclosure utilizes the tunability of free electrons to provide more degrees of freedom which fundamentally differ from their circuit QED or ion counterparts.

The invention claimed is:

1. A photonic quantum state generator configured and operable to generate one or more predetermined photonic quantum states in a range from radiofrequency to X-ray, the generator comprising:

a free particles source controllably operable to provide a flow of said free particles with predetermined one or more flow parameters;

a shaping unit located in a vicinity of a flow of the free particles and configured and operable to apply controllable wavefunction shaping to provide coherently shaped free particles in either one of time-energy domain or space-momentum domain, said controllable wavefunction shaping affecting a change in one or more parameters of the free particles comprising one or more of a frequency spacing between energy combs of the free particles, and time spacing between pulses of the free particles in a pulse train;

an interaction unit comprising a photonic structure and defining an interaction region enabling m interactions $(m \geq 1)$ between a photonic mode within said interaction region and the flow of the coherently shaped free particles having said one or more flow parameters satisfying a phase-matching condition with respect to the photonic mode, said interaction being in the form of a conditional displacement mechanism describing an effect of said change in one or more parameters of the free particles resulting from said controllable wavefunction shaping, on the photonic modes within the photonic structure, thereby generating said one or more predetermined photonic quantum states by the conditional displacement mechanism; and a control system comprising: a post-interaction measurement unit configured and operable to generate measured data indicative of at least one parameter of the free particles after the interaction; and at least one post-selection unit configured and operable to analyze the measured data and determine corresponding photonic quantum states being generated as result of the interactions with the flow of the coherently shaped free particles, and being capable of controlling feedforward operation of the shaping unit to selectively adjust parameters of the flow of the coherently shaped free particles to obtain the desired state in a next interaction session.

2. The generator according to claim 1, further comprising a control system comprising: a post-interaction measurement unit configured and operable to perform a number resolving post-interacting measurement of the free particles emerging from the interaction region, and generating measured data indicative of at least one parameter of the free particles after the interaction.

3. The generator according to claim 2, wherein said at least one parameter comprises one of the following: energy for the coherently shaped free particle in the time-energy domain, and a position in space for the coherently shaped free particle in the space-momentum domain.

4. The generator according to claim 2, wherein said post-interaction measurement unit comprises a spectrometer configured and operable to perform said number and energy resolving post-interacting measurement providing the measured data indicative of an energy change of the free particle after said interaction with the photonic mode, thereby controlling the photonic quantum states being generated.

5. The generator according to claim 2, wherein the free particles are electrons, said shaping unit comprising at least one electron beam splitter unit configured and operable to shape the wavefunction to be coherently shaped in a form of two or more spatially separated electron beams, said post-interaction measurement unit comprising an additional beam splitter operation configured to interfere the two or more spatially separated beams of electrons and an electron counting camera configured and operable to perform the number resolving measurement and providing the measured data indicative of the spatial trajectory change of the electrons after said interaction with the photonic mode and with the additional post interaction beam splitter/combiner, thereby enabling controlling the photonic quantum states being generated.

6. The generator according to claim 2, wherein said control unit further comprises a post-selection unit configured and operable to analyze the measured data and determine corresponding photonic quantum states being generated as result of the interactions with the flow of the coherently shaped free particles, enabling feedback postselection mode for selecting desired photonic quantum states.

7. The generator according to claim 2, wherein said control unit further comprises a post-selection unit configured and operable to analyze the measured data and determine corresponding photonic quantum states being generated as result of the interactions with the flow of the coherently shaped free particles, enabling feedforward operation of the shaping unit to selectively adjust parameters/conditions of the flow of the coherently shaped free particles to obtain the desired state in a next interaction session.

8. The generator according to claim 7, configured and operable to perform arbitrary single qubit gates on Gottesman-Kitaev-Preskill (GKP) quantum photonic states being generated.

9. The generator according to claim 8, configured and operable to perform quantum error correction on the GKP state in the photonic mode.

10. The generator according to claim 1, wherein said shaping unit is configured and operable to shape the wavefunction to be coherently shaped in energy in the form of an energy comb.

11. The generator according to claim 10, wherein said shaping unit is configured and operable to provide said wavefunction coherently shaped in time in a form of a pulse train having an energy spectrum in a form of a series of peaks with equal energy spacing $N \cdot \hbar \omega$ between neighboring peaks, where $\omega$ is a frequency of said photonic mode defined by said photonic structure, and N is an integer $N \geq 2$, the coherently shaped pulse train while interacting with the photonic mode, generating radiation in the form of a superposition of N coherent photonic states of different phases.

12. The generator according to claim 11, wherein said peaks are of substantially equal amplitudes and of approximately linear phase relation.

13. The generator according to claim 11, wherein a value of N is selected in accordance with the one or more predetermined photonic quantum states to be generated, such that the energy spacing includes a selected number of k-shifted energy states of the free particles with a $\hbar \omega$ shift, k being an integer from 0 to (N−1).

14. The generator according to claim 11, wherein the shaping unit comprises: an electromagnetic field source applying an electromagnetic field onto the free particles having a frequency $F_{EM}$ in a predetermined relation with a frequency of $F_{RS}$ of said photonic mode, thereby producing said coherently shaped pulse train.

15. The generator according to claim 14, wherein said relation satisfies the following condition: $F_{EM} = N \cdot F_{RS}$.

16. The generator according to claim 14, wherein said shaping unit comprises a free-electron laser.

17. The generator according to claim 14, comprises a resonating structure configured and operable as said shaping unit and said interaction unit.

18. The generator according to claim 1, wherein said shaping unit is configured and operable to shape the wavefunction to be coherently shaped in a form of two or more spatially separated beams of free particles.

19. The generator according to claim 18, wherein the free particles are electrons, said shaping unit comprises at least one electron beam splitter unit which comprises any one of electron bi-prism or electron phase-plate to thereby provide said two or more spatially separated beams of free particles.

20. The generator according to claim 1, wherein the free particles are electrons.

21. The generator according to any one of claim 1, wherein the free particles are atoms or molecules.

22. The generator according to claim 1, wherein the free particles are photons.

23. The generator according to claim 22, wherein a medium of the photonic structure defining the photonic mode is a resonating medium.

24. The generator according to claim 23, wherein said resonating medium comprises a non-linear medium.

25. The generator according to claim 1, wherein the free particles comprise one of the following: atoms, molecules or photons; and the photonic structure defining the photonic mode comprising one of the following: an optomechanical system or electro-optical system.

26. The generator according to claim 1, wherein the photonic structure defining said photonic mode comprises a photonic cavity.

27. The generator according to claim 1, wherein the photonic structure defining the photonic mode comprises one of the following: waveguide, cavity, photonic nanostructure.

28. The generator according to claim 1, wherein the photonic quantum states produced by said interaction include superposition of Gaussian states comprising one or more of the following: cat states, squeezed vacuum light states, and coherent grid states.

29. The generator according to claim 28, wherein said coherent grid states comprise Gottesman-Kitaev-Preskill (GKP) states.

30. The generator according to claim 29, wherein said GKP states are generated with above 10 dB squeezing and fidelities above 90% at post-selection probability of 10%.

31. The generator according to claim 29, wherein said GKP states are generated with post-selection probability above 30% using an initially squeezed vacuum state.

32. The generator according to claim 29, configured and operable to provide entanglement between multiple GKP states using the interaction between a single electron qubit with multiple photonic modes.

33. The generator according to claim 32, wherein said interaction with multiple GKP states provides two qubit gates between two GKP states.

34. The generator according to claim 32, wherein said interaction with multiple GKP states provides entangled multi qubits states, comprising GHZ and/or cluster state.

35. The generator according to claim 1, wherein the free particles are ions.

36. The generator according to claim 1, wherein said one or more predetermined photonic quantum states correspond to information qubits.

37. A quantum computing system comprising the generator according to claim 1.

\* \* \* \* \*